(12) United States Patent
Wigley

(10) Patent No.: US 9,944,356 B1
(45) Date of Patent: Apr. 17, 2018

(54) SHAPE SHIFTING FOILS

(71) Applicant: Alexander T. Wigley, Vashon, WA (US)

(72) Inventor: Alexander T. Wigley, Vashon, WA (US)

( * ) Notice: Subject to any disclaimer, the term of this patent is extended or adjusted under 35 U.S.C. 154(b) by 298 days.

(21) Appl. No.: 15/051,559

(22) Filed: Feb. 23, 2016

Related U.S. Application Data

(63) Continuation of application No. 12/731,587, filed on Mar. 25, 2010.

(60) Provisional application No. 61/163,330, filed on Mar. 25, 2009.

(51) Int. Cl.
| | |
|---|---|
| B64C 3/52 | (2006.01) |
| B63B 3/38 | (2006.01) |
| F03D 1/06 | (2006.01) |
| F03D 7/02 | (2006.01) |
| F01D 5/14 | (2006.01) |
| F01D 7/00 | (2006.01) |
| B63B 39/06 | (2006.01) |
| B64C 3/26 | (2006.01) |
| B64C 9/00 | (2006.01) |
| B63B 1/24 | (2006.01) |
| B64C 11/20 | (2006.01) |
| B64C 27/473 | (2006.01) |
| B63H 1/26 | (2006.01) |

(52) U.S. Cl.
CPC ................. *B63B 3/38* (2013.01); *B63B 1/24* (2013.01); *B63B 39/06* (2013.01); *B63H 1/26* (2013.01); *B64C 3/26* (2013.01); *B64C 9/00* (2013.01); *B64C 11/20* (2013.01); *B64C 27/473* (2013.01); *F01D 5/141* (2013.01); *F01D 5/147* (2013.01); *F01D 7/00* (2013.01); *F03D 1/0675* (2013.01); *F03D 7/0236* (2013.01); *F05D 2220/30* (2013.01); *F05D 2240/301* (2013.01)

(58) Field of Classification Search
CPC ....... B64C 3/44; B64C 3/52; B64C 2003/445; B64C 3/48
USPC ................................ 244/219, 218, 201, 200
See application file for complete search history.

(56) References Cited

U.S. PATENT DOCUMENTS

| | | |
|---|---|---|
| 1,344,244 A | 6/1920 | Patterson |
| 1,613,890 A | 1/1927 | Herreshoff |
| 1,790,309 A | 1/1931 | Kientz |
| 1,856,578 A | 5/1932 | Miquel et al. |

(Continued)

FOREIGN PATENT DOCUMENTS

| | | |
|---|---|---|
| EP | 0453713 | 10/1991 |
| GB | 2 386 884 A | 10/2003 |

(Continued)

OTHER PUBLICATIONS

Small Trimaran Design, Mast-Rig Options for the Future, http://smalltridesign/com/masts/rig-mast_options.html, Nov. 2012, last visited Oct. 7, 2013, 5 pp.

*Primary Examiner* — Christopher P Ellis
(74) *Attorney, Agent, or Firm* — Stoel Rives LLP

(57) ABSTRACT

A shape shifting foil alters the shape of a fluid foil contour by rotating a leading edge structure. A skin that forms the fluid foil contour is at least partially attached to the leading edge structure, and is wrapped around the leading edge structure so two edges of the skin form the trailing edge of the fluid foil. The two edges forming the trailing edge slide with respect to one another, thereby permitting the skin to shift when the leading edge structure is rotated.

20 Claims, 19 Drawing Sheets

(56) References Cited

U.S. PATENT DOCUMENTS

| | | | |
|---|---|---|---|
| 2,350,809 A | 6/1944 | Pelessoni | |
| 3,127,130 A | 3/1964 | Lyon | |
| 3,179,357 A | 4/1965 | Lyon | |
| 3,361,386 A * | 1/1968 | Smith | B64C 3/48 244/12.1 |
| 4,064,821 A | 12/1977 | Edmoncs et al. | |
| 4,074,646 A | 2/1978 | Dorfman et al. | |
| 4,247,066 A | 1/1981 | Frost et al. | |
| 4,280,433 A | 7/1981 | Haddock | |
| 4,281,812 A | 8/1981 | Zimmer | |
| 4,341,176 A | 7/1982 | Orrison | |
| 4,388,274 A | 6/1983 | Riolland | |
| 4,695,014 A | 9/1987 | Mourani | |
| 4,766,831 A | 8/1988 | Johnston | |
| 4,895,091 A | 1/1990 | Elmali et al. | |
| 5,181,678 A | 1/1993 | Widnall et al. | |
| 5,279,241 A | 1/1994 | Aguilera | |
| 5,288,039 A * | 2/1994 | DeLaurier | B64C 3/52 244/219 |
| 5,367,970 A | 11/1994 | Beauchamp et al. | |
| 5,662,294 A | 9/1997 | Maclean et al. | |
| 5,839,698 A | 11/1998 | Moppert | |
| 5,839,700 A | 11/1998 | Nedderman | |
| 5,934,214 A | 8/1999 | Ketterer | |
| 5,941,480 A | 8/1999 | Wille | |
| 5,947,422 A | 9/1999 | Wille | |
| 6,010,098 A | 1/2000 | Campanile et al. | |
| 6,045,096 A | 4/2000 | Rinn et al. | |
| 6,070,834 A | 6/2000 | Janker et al. | |
| 6,145,791 A * | 11/2000 | Diller | B64C 3/48 244/130 |
| 6,276,641 B1 * | 8/2001 | Gruenewald | B64C 3/48 244/213 |
| 6,419,187 B1 * | 7/2002 | Buter | B64C 3/44 244/34 R |
| 7,108,231 B2 | 9/2006 | Perez-Sanchez | |
| 7,147,271 B2 | 12/2006 | Aase et al. | |
| 7,160,158 B2 | 1/2007 | Kinoshita | |
| 7,166,003 B2 | 1/2007 | Motose | |
| 7,219,855 B2 | 5/2007 | Hamamoto et al. | |
| 7,246,524 B1 | 7/2007 | Kholwadwala et al. | |
| 7,278,679 B2 | 10/2007 | Yang et al. | |
| 7,286,326 B2 | 10/2007 | Elzey et al. | |
| 7,364,480 B2 | 4/2008 | Ito et al. | |
| 7,384,016 B2 | 6/2008 | Kota et al. | |
| 7,422,495 B2 | 9/2008 | Kinoshita et al. | |
| 7,425,103 B2 | 9/2008 | Perez-Sanchez | |
| 7,429,074 B2 | 9/2008 | McKnight et al. | |
| 7,430,466 B2 | 9/2008 | Kaneko et al. | |
| 7,434,527 B2 | 10/2008 | Brighi | |
| 7,443,078 B1 | 10/2008 | DuBrucq | |
| 7,530,533 B2 | 5/2009 | Perez-Sanchez | |
| 8,191,826 B2 * | 6/2012 | Daynes | B64C 3/48 244/123.1 |
| 9,233,749 B1 * | 1/2016 | Joo | B64C 3/48 |
| 9,457,887 B2 * | 10/2016 | Roe | B64C 3/54 |
| 9,856,012 B2 * | 1/2018 | Xi | B64C 3/38 |
| 2006/0186269 A1 | 8/2006 | Kota et al. | |
| 2012/0104181 A1 * | 5/2012 | Rix | B64C 3/48 244/219 |
| 2013/0064666 A1 * | 3/2013 | Thomas | B64C 3/52 416/158 |

FOREIGN PATENT DOCUMENTS

| | | |
|---|---|---|
| WO | WO 87/00814 | 2/1987 |
| WO | WO 2006/009439 | 1/1996 |

* cited by examiner

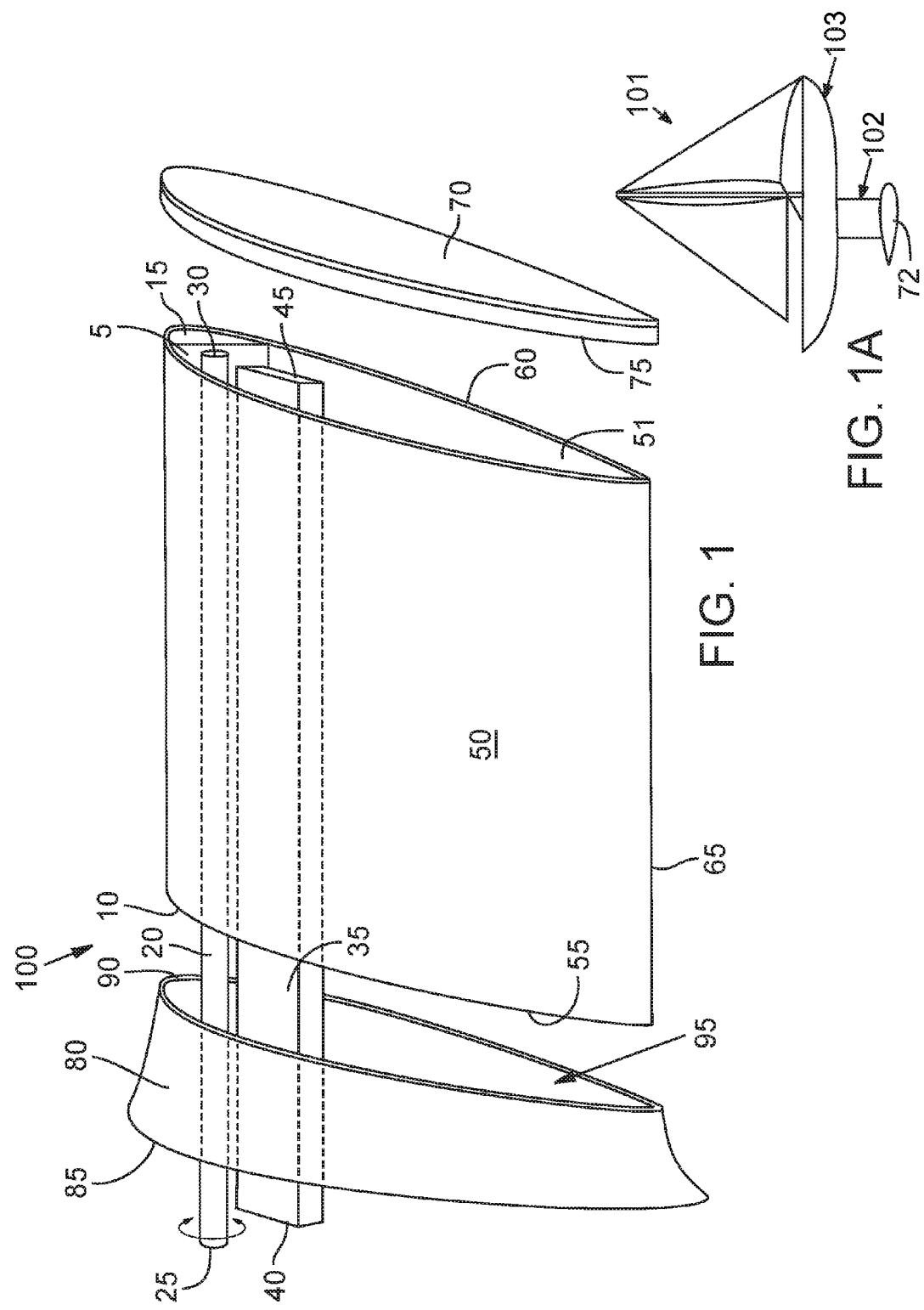

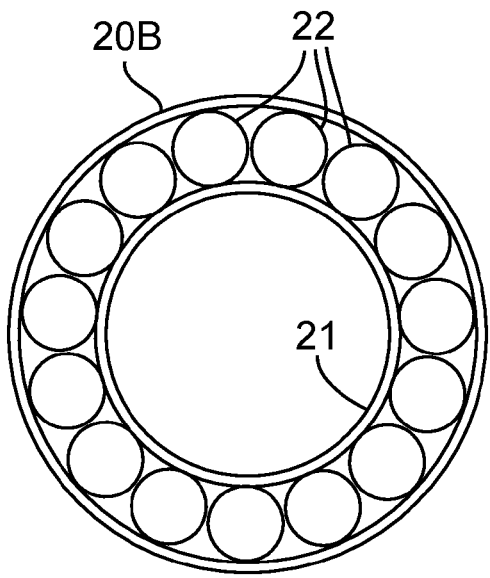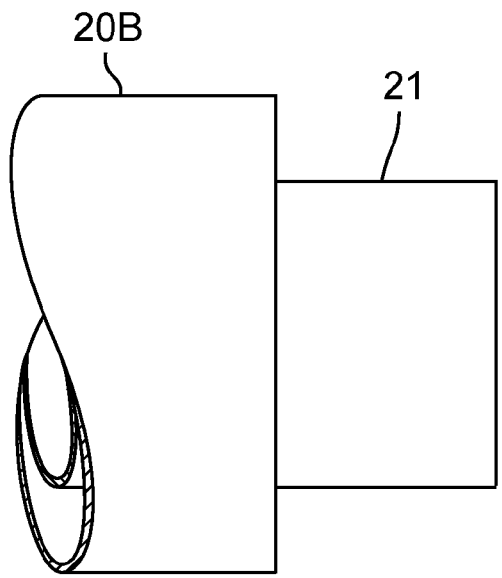
Fig. 1B          Fig. 1C
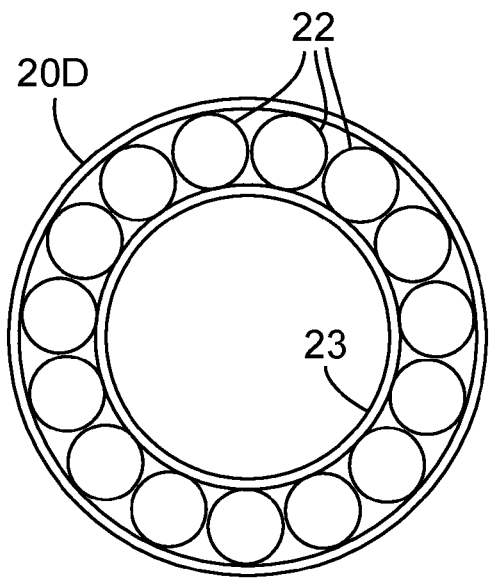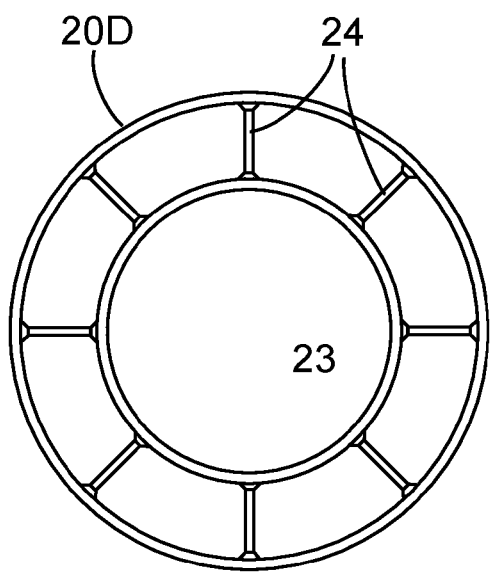
Fig. 1D          Fig. 1E

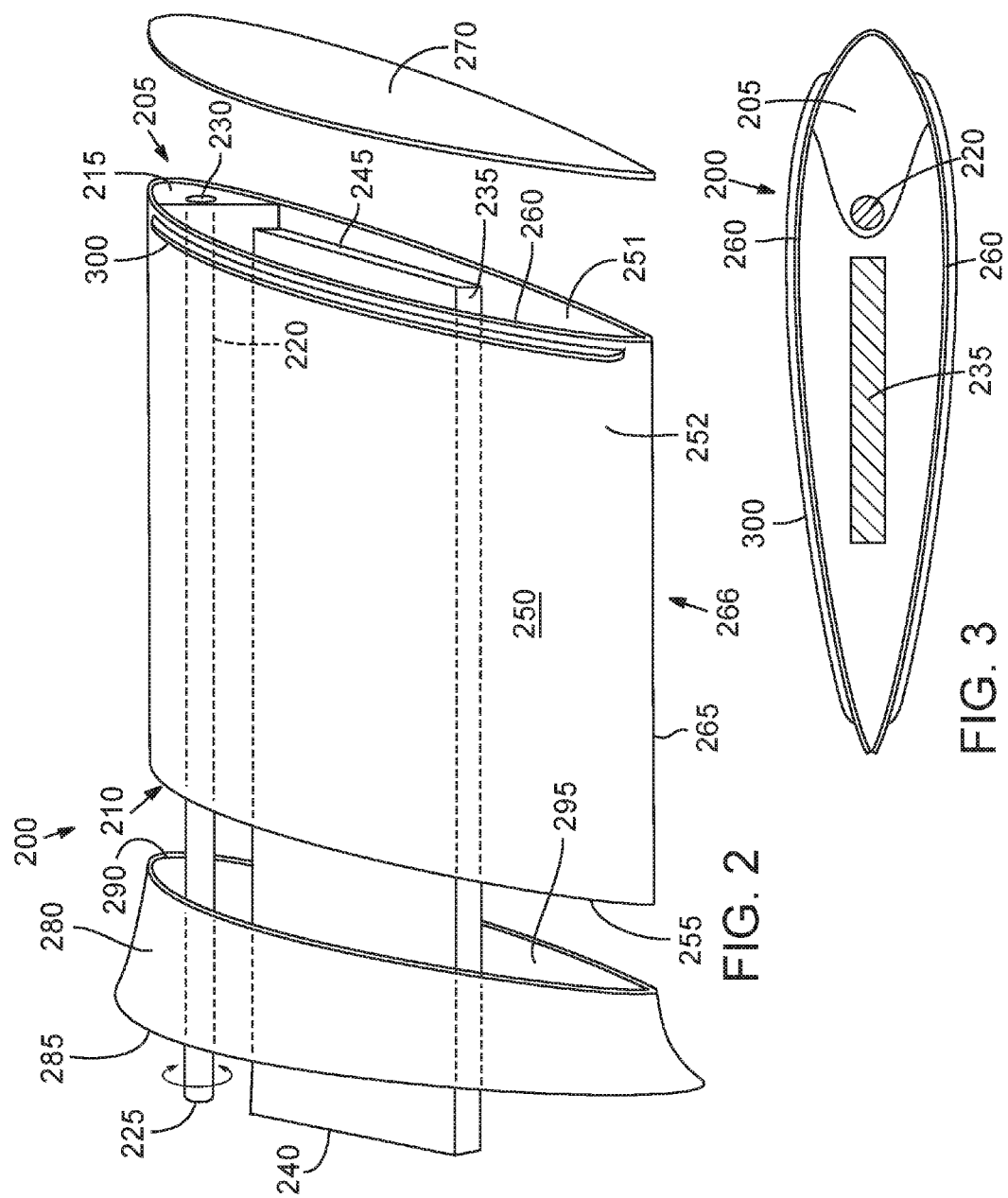

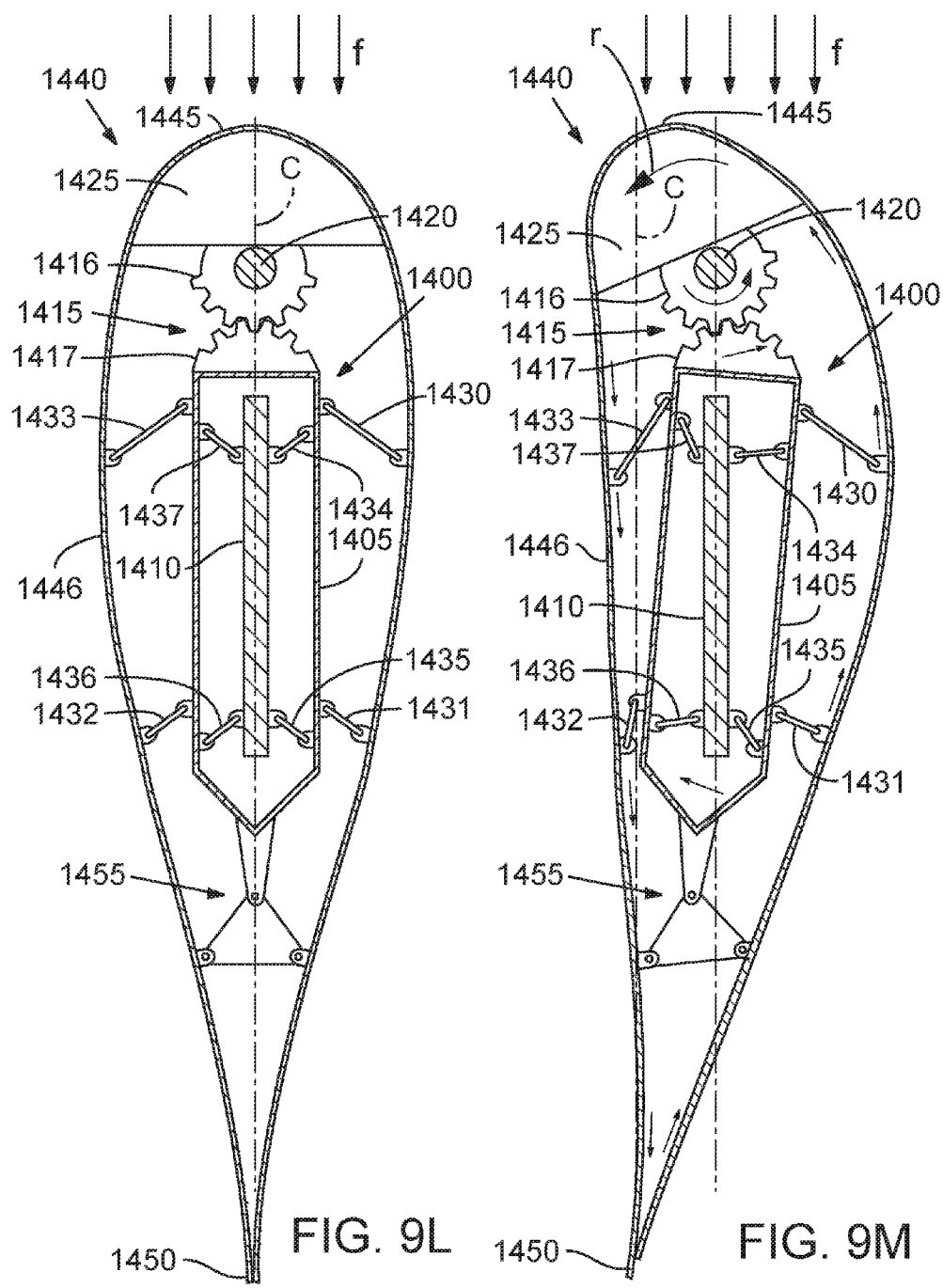

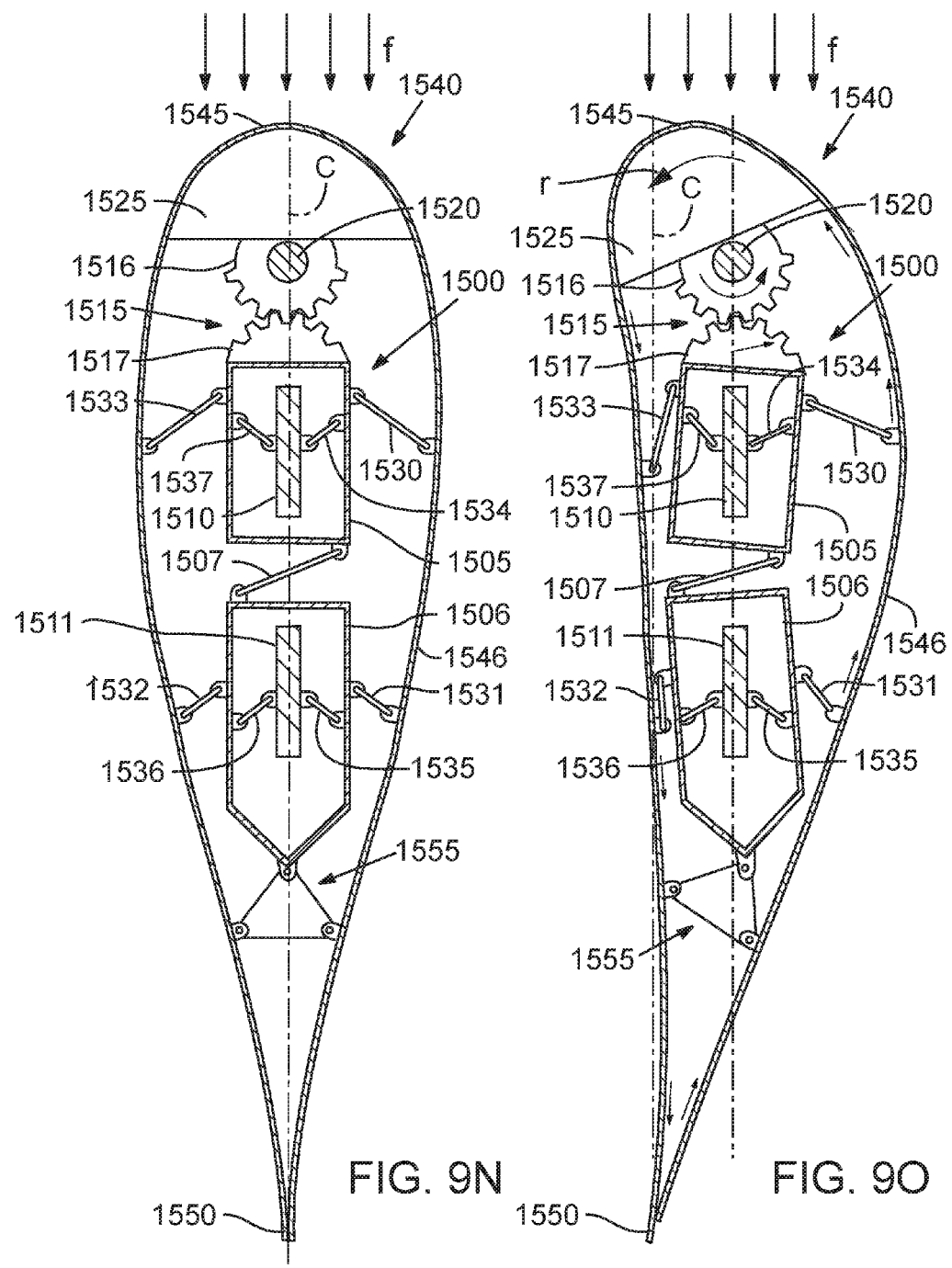

SHAPE SHIFTING FOILS

RELATED APPLICATIONS

This application is a continuation of and claims the benefit under 35 U.S.C. § 120 from U.S. patent application Ser. No. 12/731,587, filed Mar. 25, 2010, which is a nonprovisional of and claims the benefit under 35 U.S.C. § 119(e) from U.S. Patent App. No. 61/163,330, filed Mar. 25, 2009, the disclosures of which are each fully incorporated by reference herein.

BACKGROUND

The present disclosure relates to fluid foils and mechanisms and methods for altering the shape of a fluid foil. Fluid foils are used for a variety of applications including lifting bodies and directional control surfaces for aircraft, lifting bodies and directional control surfaces for watercraft, keels on sailboats, turbine blades, propeller blades, helicopter rotors, and wind turbine blades.

Some common fluid foils are designed as primarily static structures, for example, current wind turbine blades. Other common fluid foil designs may include movable sections typically referred to as flaps, ailerons, and trim tabs, for example, a wing on an airliner. Static fluid foils are commonly rotated to adjust their pitch, but components of the fluid foils do not move with respect to one another.

Design principles for fluid foils are commonly used to construct fluid foils suited to particular applications and account for the opposing forces of lift and drag that are created when a fluid flows over a foil. A fluid foil is commonly designed to create lift, which often depends on the speed and/or density of a fluid flowing over the fluid foil. Typically, when the fluid speed over a foil is relatively slow, the foil is designed as a high lift foil by having a large camber and a large angle of attack. These high lift foils tend to induce a relatively large drag force. When the fluid speed increases, however, there is a reduced need for a high-lift foil, and an increased need for a low drag foil. Optimally, camber would be reduced and the angle of attack made smaller. Changing the lift and drag characteristics associated with a fluid foil requires altering the shape of the fluid foil and/or the angle of attack with respect to the moving fluid. Therefore, static fluid foils necessarily embody design trade-offs for lift and drag depending on the application and expected fluid densities and speeds in which the foil will be operated.

Fluid foils capable of changing their shape have been constructed for many years. The Wright brothers used cables to warp the shape of the wings to control the Wright Flyer as described in U.S. Pat. No. 821,393. Since then many mechanisms for changing the shape of a fluid foil have been created. Flaps, ailerons, and trim tabs are currently used on aircraft wings, are typically exposed to the flowing fluid, and are moved to alter the lift and drag characteristics of a wing. Moving current flaps, ailerons, and trim tabs requires complex mechanical systems, which adds to the weight and expense of fluid foils, and commonly creates gaps in their overall contours, which increases the induced drag forces created by the fluid flowing over the foil.

Exemplary mechanisms for altering the shape of a fluid foil without using flaps or ailerons are described in U.S. Pat. Nos. 4,247,066; 5,367,970; 5,839,700; 6,010,098; and 6,045,096. The present inventor has realized that drawbacks to such mechanisms for altering the shape of a fluid foil are that they are often complex, delicate, use expensive materials such as shape memory alloy wires like Nitenol wires, or include two or more such drawbacks.

SUMMARY

Embodiments discussed below describe a fluid foil constructed to change its shape, and may address some or all of the above noted drawbacks with existing fluid foils, or may address other disadvantages.

An exemplary shape shifting fluid foil includes a spar for attaching the fluid foil to the body of a boat, aircraft, propeller hub, or other suitable body. An axle is rotatably attached to the body and is also attached to a leading edge structure for rotating the leading edge structure with respect to the spar. A skin wrapped over the leading edge structure and the spar forms the outer contour of the fluid foil. A portion of the skin is attached to the leading edge structure, and the trailing edges of the skin slidably engage one another to form the trailing edge of the fluid foil. Rotating the leading edge structure in a first direction shifts the shape of the fluid foil by pulling on the first side of the skin forming the outer contour of the fluid foil while pushing on the second side of the skin forming the outer contour of the fluid foil. Rotating the leading edge structure in a second direction shifts the shape of the fluid foil by pushing on the first side of the skin forming the outer contour of the fluid foil while pulling on the second side of the skin forming the outer contour of the fluid foil. The trailing edges of the skin slide to accommodate the pushing and pulling on the first and second sides of the skin that forms the fluid foil contour.

Additional aspects and advantages will be apparent from the following detailed description of preferred embodiments, which proceeds with reference to the accompanying drawings.

BRIEF DESCRIPTION OF THE DRAWINGS

FIG. 1 illustrates an assembly view of a fluid foil.

FIG. 1A illustrates a fluid foil including a ballast as a sailboat keel.

FIG. 1B illustrates a cross sectional view of an axle for use with a fluid foil.

FIG. 1C illustrates a left side view of an end of the axle of FIG. 1B

FIG. 1D illustrates a cross sectional view of another axle for use with a fluid foil.

FIG. 1E illustrates a cross sectional view of an end of the axle of FIG. 1D.

FIG. 2 illustrates an assembly view of another fluid foil.

FIG. 3 illustrates an end view of the fluid foil of FIG. 2 without the tip cover.

FIG. 9L illustrates a sectional view of a fluid foil including another spacing device including a carrier device.

FIG. 9M illustrates a sectional view of the fluid foil of FIG. 9L with the fluid foil contour shifted and with the spacing device shifted in a first direction.

FIG. 9N illustrates a sectional view of a fluid foil including another spacing device including a carrier device.

FIG. 9O illustrates a sectional view of the fluid foil of FIG. 9N with the fluid foil contour shifted and with the spacing device shifted in a first direction.

DETAILED DESCRIPTION OF PREFERRED EMBODIMENTS

Figure 2A:
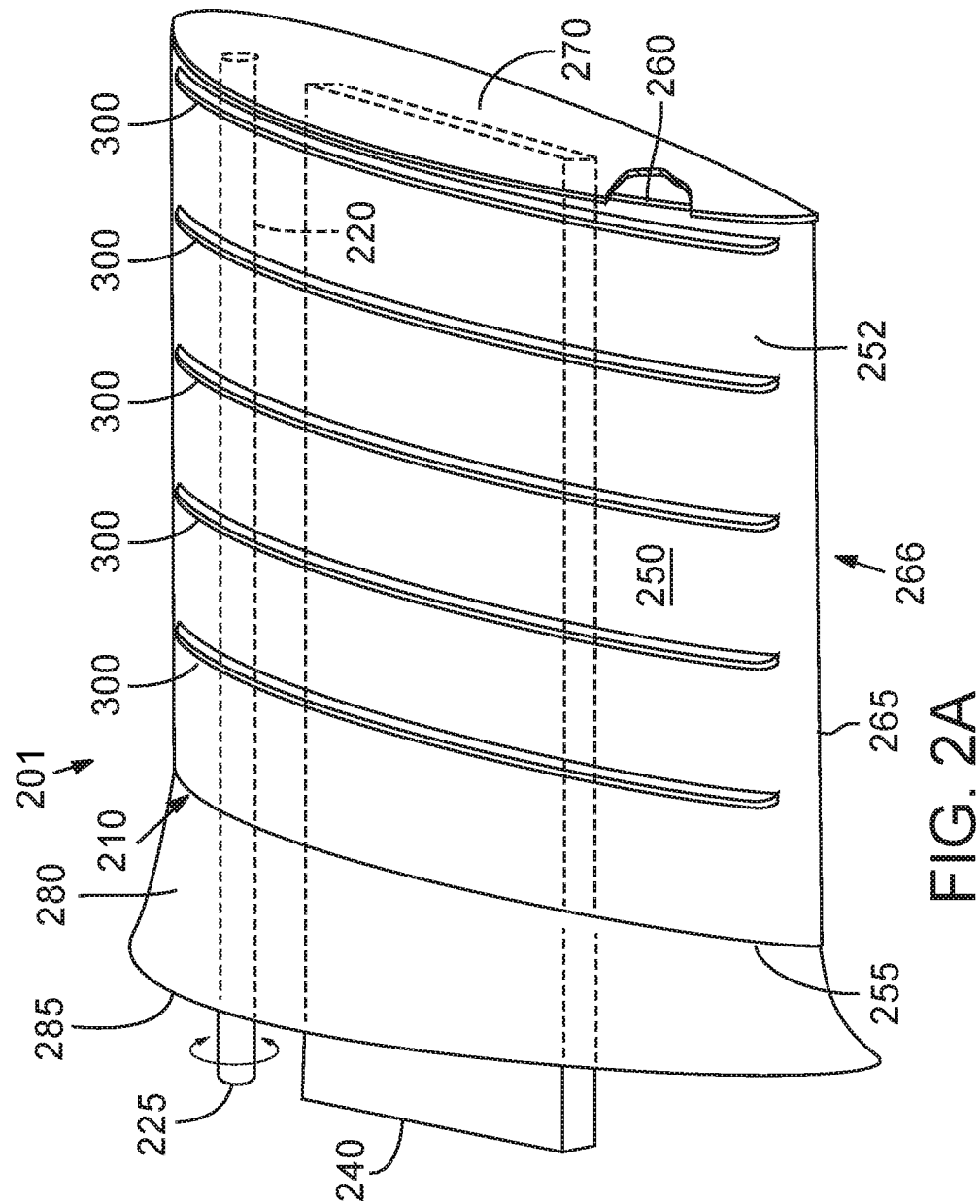
FIG. 2A illustrates an assembled fluid foil including multiple fences and a tip cover that acts as a fence.

An exemplary embodiment is illustrated in FIG. 1. The description of FIG. 1 refers to the fluid foil 100 as a sailboat keel, for example, keel 102 (FIG. 1A), however, the fluid foil 100 may be used in other suitable applications such as, but not limited to, an aircraft wing, a dive plane for a submarine, a helicopter rotor, a wind turbine blade, and a turbine impeller.

A spar 35 including a root section 40 and a tip end 45 provides structural support for the fluid foil 100. The spar 35 attaches to a boat hull 103 (FIG. 1A), for example, by protruding the root section 40 through an outer shell and bolting, welding, or otherwise suitably attaching the root section 40 to an internal structure of the boat hull, or other body. In alternate embodiments, the spar 35 may protrude through two opposing sides of a body, for example through the left and right sides of an aircraft, and the spar 35 may be secured to structure within the body. In such an instance, the root section 40 of the spar may actually be the longitudinal center of the spar, the portion of the spar contained within or proximate the body, or both. Other alternate embodiments may include more than one spar.

An axle 20 is rotatably attached to the boat hull so that the axle 20 may be rotated about its longitudinal axis. For example, the axle 20 may protrude through a sailboat hull and into the cockpit. Bearings (not illustrated) in the cockpit and in the boat hull structure may rotatably attach the axle 20 to the hull. The root section 25 of the axle 20 may interface with a mechanical device, such as a lever, winch (hand or motor powered), or other suitable device for imparting rotational force to the axle 20. A leading edge structure 5 is attached to the axle 20. For example, the axle 20 may be bolted, glued, welded, embedded in the leading edge structure 5 (FIGS. 2 and 3), or otherwise suitably attached to the leading edge structure 5. Attaching the leading edge structure 5 to the axle 20 permits the axle 20 to rotate the leading edge structure 5 and thereby change one or more fluid foil features, such as the contour of a fluid foil or angle of attack, as discussed below.

The leading edge structure 5 defines a leading edge contour for the fluid foil 100. For a sailboat, the leading edge structure 5 may define a symmetric leading edge, fluid foil contour, or both, for example as illustrated in FIG. 3. Alternate embodiments may include a leading edge structure 5 that defines an asymmetric leading edge contour, a leading edge contour that tapers in a direction extending away from the body, a leading edge contour that exhibits a twist, or any combination of the foregoing. Likewise, the fluid foil contour may be asymmetric, taper, or have another suitable shape.

The leading edge structure 5 may be made from a single piece of material, for example, from a light weight foam such as polystyrene, or from wood; or the leading edge structure 5 may be made from a composite material such as fiberglass mats and resin, carbon fiber mats and resin, (both with or without foam layers); or the leading edge structure 5 may include a frame, for example, but not limited to, a welded aluminum or steel tubing frame or a frame of bonded graphite tubes that is either uncovered or covered with a sheet such as a fiberglass or carbon fiber mat impregnated with resin, a sheet of fabric, a plastic sheet, or a sheet of aluminum or steel that is riveted or welded in place.

A skin 50 is wrapped around the leading edge structure 5 and around the spar 35 to define the contour of the fluid foil 100. Portions of the skin 50 that are wrapped around the leading edge structure 5 are attached to the leading edge structure 5, for example, by glue or other adhesive, rivets, spot welds, or other suitable attachment. When the skin 50 is wrapped around the leading edge structure 5, the skin 50 has a root edge 55, a tip edge 60 and two trailing edges 65 (only one illustrated in FIG. 1) extending between the root edge 55 and the tip edge 60. The two trailing edges 65 slidably engage one another to form the trailing edge of the fluid foil 100. Slidable engagement for the two trailing edges 65 is described in more detail below. The skin 50 may be one piece of material, several pieces of material joined together, or multiple separate pieces of material extending from the leading edge structure 5.

The root edge 55 of the skin 50 may abut, or otherwise be placed proximate the boat hull or other suitable body. Preferably, a fairing 80 is attached to the boat hull or other suitable body along edge 85. The fairing 80 may be riveted, glued, adhered, bolted, or otherwise suitably attached to the body. An opening 95 is sized to receive the root edge 55 of the skin 50 by overlying the edge 90 over the skin 50 to inhibit fluid from flowing from the surface of the skin 50 and over the root edge 55 between the skin 50 and the boat hull or other suitable body. The fairing 80 may contact, or be connected to the skin 50, in a substantially fluid tight or impervious manner. The fairing 80 is preferably made from a resilient material that substantially inhibits fluid from flowing between the skin 50 and the boat hull or other suitable body, even when the leading edge structure 5 rotates. For example, the fairing 80 may be made from natural rubber, polychloroprene, polyvinyl chloride, polypropylene, nylon, or other suitable material.

In the embodiment illustrated in FIG. 1, a tip cover 70 is included to inhibit fluid from flowing from the skin 50 over the tip edge 60 and into the interior of the fluid foil 100. The tip cover 70 is attached to the tip end 45 of the spar 35 by bolts, rivets, nails, screws, welds, glue, adhesive, or other suitable attachment. The tip cover 70 is preferably constructed from a rigid material, but deformable or other non-rigid materials may be used. In a preferred embodiment, the tip cover 70 includes a boot 75 that overlies the tip edge 60 of the skin 50. The boot 75 is preferably made from a resilient material similar to the fairing 80. The boot 75, in conjunction with the tip cover 70, may further inhibit fluid from flowing from the skin 50 over the tip edge 60 and into the interior of the fluid foil 100.

In other embodiments, a fluid foil may have a tip cover attached to an axle, the skin, or a spar, individually or in any combination. Alternately, tip edge 60 of skin 50 may be constrained from rotational movement, preferably to induce, individually or in any combination, a differential fluid foil feature, such as a contour, camber, or angle of attack that varies along a length of a fluid foil, such as fluid foil 100. For example, tip cover 70 may be non-rotatably attached to the tip end 45 of spar 35. And, tip edge 60 of skin 50 may be rigidly secured to tip cover 70 using glue or other suitable adhesive, welding, rivets, screws, or other suitable attachment. Preferably, constraining the tip edge 60 provides variable angular displacement for axle 20 as it extends from its root section 25 to its tip end 30. Alternately, tip end 30 of axle 20 may be rotationally constrained, for example, by non-rotatably attaching tip end 30 to tip cover 70. In yet other embodiments, the torsional resistance of axle 20 may be variable along its length to induce differential rotational movement of leading edge structure 5 along the length of axle 20 to create a differential fluid foil feature along a length of a fluid foil.

In other embodiments, inducing a differential fluid foil feature, such as a contour, camber, or angle of attack that varies along a length of a fluid foil, singularly or in any combination, may be accomplished by restraining the root section 25 of axle 20 from rotational movement and using an actuator to impart rotational movement to leading edge structure 5 other than at its root portion 10. For example, FIG. 1B illustrates an actuator including axle 20B that can be rotationally constrained at its root section 25. A secondary axle 21 extends the length of axle 20B, and is preferably held in place by one or more ball bearing races 22. Preferably, ball bearing races 22 permit secondary axle 21 to rotate within axle 20B without imparting rotational movement to axle 20B. At tip end 30, secondary axle 21 preferably extends past the end of axle 20B. The portion of secondary axle 21 extending beyond axle 20B is preferably non-rotatably connected to leading edge structure 5. Thus, when secondary axle 21 rotates, rotational movement is imparted proximate the tip section 15 of leading edge structure 5. Optionally, portions of leading edge structure 5, such as portions proximate its tip section 15, may not be secured to axle 20B to further induce a differential fluid foil feature along a length of a fluid foil, such as fluid foil 100.

Another exemplary actuator is illustrated in FIG. 1C. Axle 20C includes a secondary axle 23 extending the length of axle 20C and held in place by ball bearing races 22. At the tip end 30, secondary axle 23 is non-rotatably attached to axle 20C, for example by welding a plurality of rods 24 connecting between axle 20C and secondary axle 23. Constraining the root section 25 of axle 20C and rotating secondary axle 23 preferably imparts rotational movement to leading edge structure proximate its tip section 15, and preferably induces a differential fluid foil feature along a length of a fluid foil, such as fluid foil 100.

In alternate embodiments, an actuator, such as an electric motor, pneumatic or hydraulic pump, or other suitable actuator, may be located proximate the tip end 30 of axle 20 for imparting rotational movement to axle 20 while the root section 25 is restrained against rotational movement. Optionally, location of an actuator may be anywhere along the length of axle 20. As with previous embodiments, embodiments including an actuator that acts on an axle, such as axle 20, or a leading edge structure, such as leading edge structure 5, at a root end, a tip end, or anywhere in between may include a leading edge structure that defines an asymmetric leading edge contour, a leading edge contour that tapers in a direction extending away from the body, a leading edge contour that exhibits a twist, or any combination of the foregoing. Likewise, the fluid foil contour may be asymmetric, taper, or have another suitable shape.

Alternatively, a tip cover may be omitted, or may only partially close the opening created by the tip edge of the skin. In yet another embodiment, a tip cover may be omitted and one or more fences (for example, as illustrated in FIG. 2A) may be included to inhibit fluid from flowing from the skin over the tip edge and into the interior of the fluid foil.

The tip end 30 of the axle 20 may stop short of the tip cover 70, or may touch the tip cover 70. Alternately, the tip end 30 of the axle 20 may be rotatably connected to the tip cover 70, so that rotation of the axle 20 does not rotate the tip cover 70. Alternatively, the tip cover 70 may be rotated by the axle 20.

Additional components may be included in or on the fluid foil 100, such as a spacing device attached to the spar 35 and constructed to hold the skin 50 in a spatial relationship with respect to the spar 35, as described in more detail below. A link structure may also be attached to the inside surfaces 51 of the skin 50 proximate the trailing edges 65 to hold the trailing edges 65 proximate one another, as also described in more detail below. As illustrated in FIG. 1A, a ballast 72 may be attached, either in place of the tip cover 70, as part of the tip cover 70, or through the tip cover 70 to the tip end 45 of the spar 35. In applications other than as a sailboat keel, the ballast 72 may be replaced, for example, with a tip fuel tank, winglet, or other suitable structure. Alternately, a separate shape-shifting fluid foil may surround the ballast 72, as discussed below.

Another embodiment of a fluid foil 200 is illustrated in FIGS. 2 and 3. The sheet of skin 250 may be made from a seamless, single piece of material, for example from a fiberglass or carbon fiber lay-up, a sheet of polyurethane, a sheet of nylon, a sheet of high density polyethylene, a sheet of aluminum or steel, or other suitable material; or the skin 250 may include several pieces of material that are sewn, welded, glued, adhered, or otherwise suitably attached to one another to form the skin 250.

The skin 250 is wrapped over the leading edge structure 205 and portions of the skin 250 are attached to the leading edge structure 205 as described above. As described in more detail below, the trailing edges 265 of the skin 250 slidably engage one another to form a trailing edge 266 of the fluid foil 200.

An axle 220 is embedded in the leading edge structure 205, and thereby attached to the leading edge structure 205. A root section 225 of the axle 205 protrudes into a body (not illustrated) when the fluid foil 200 is attached to the body, and is rotatably supported by the body. An actuator for imparting rotational movement to the axle 220 is preferably attached to the root section 225. Motors, hydraulic or pneumatic actuators, winches, levers, cam devices, or other suitable mechanisms in or on the body may be used to rotate the axle 220. Likewise, a root section 240 of the spar 235 protrudes into a body when the fluid foil 200 is attached to the body. The spar 235 is rigidly attached to the body. Alternately, the spar 235 may be rotationally attached to the body to permit pitch adjustment of the fluid foil 200.

A fairing 280 attaches to the body along edge 285. The fairing 280 may be attached to the body as described above. The edge 290 of the fairing 280 overlies the skin 250 so that the root edge 255 of the skin 250 is contained in the cavity 295 when the fluid foil 200 is attached to a body. The fairing 250 inhibits fluid from flowing between the root edge 255 and the body. Preferably, the fairing 280 is made from a resilient material that deforms when the axle 220 rotates the leading edge structure 205 thereby deforming the contour of the fluid foil 200.

A tip cover 270 is attached to the spar 235 for inhibiting fluid from flowing from the outer surface 252 of the skin 250 to the inner surface 251 of the skin 250 over the tip edge 260. The axle 220 may be rotatably secured to the tip cover 270.

A fence 300 attached to the outer surface 252 of the skin 250 preferably extends between ½ and 3 inches above the outer surface 252. The fence 300 may be attached by adhesive, glue, riveting, welding, or other suitable attachment. Alternately, the fence 300 may be molded as a part of the skin 250. The fence 300 preferably includes a ½ inch base that tapers away from the skin 250 to resemble an elongate dorsal fin. The fence 300 is preferably located proximate the tip edge 260 of the skin 250 to inhibit fluid from flowing from the outer surface 252 of the skin 250 and over the tip edge 260 of the skin 250.

Another preferred embodiment of a fluid foil 201 illustrated in FIG. 2A includes multiple fences 300 extending from the skin 250. Additionally, the tip cover 271 may be oversized, that is, as large as or larger than the maximum deflection of the skin 250 caused by rotating leading edge structure 205. Such an oversize tip cover 271 may also act like a fence 300 to inhibit fluid from flowing from the outer surface 252 of the skin 250 and over the tip edge 260 of the skin 250. A portion of the tip cover 271 is removed in FIG. 2A to view the tip edge 260.

Slidable Trailing Edges

Figure 4:
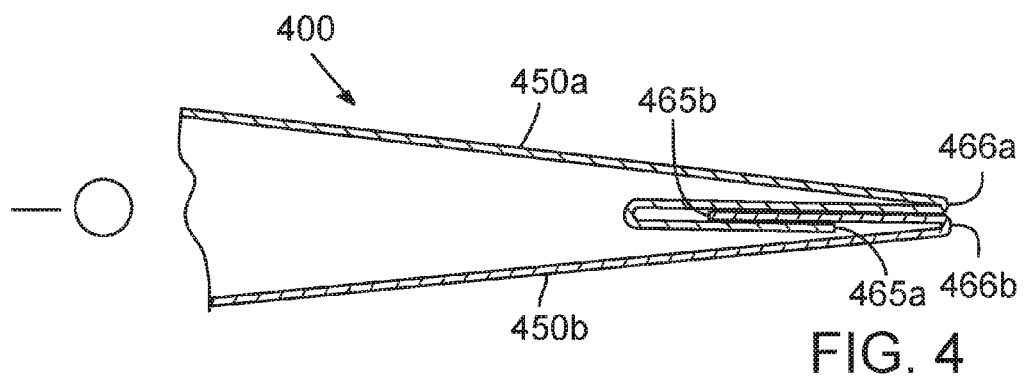
FIG. 4 illustrates a sectional detail of the trailing edges of a fluid foil skin bent and coupled together.

FIG. 4 illustrates one slidable structure for slidably engaging the trailing edges 465a and 465b of the skin 450, specifically by bending and coupling the longitudinal trailing edges 465 of the skin 450. A portion of the skin 450 that is proximate the first longitudinal edge 465a is bent, roughly approximating an "S," to form a fluid foil trailing edge portion 466a. A second portion of the skin 450 is bent so that the second longitudinal edge 465b overlaps the first longitudinal edge 465a. The bent second portion forms a fluid foil trailing edge portion 466b. Together, the fluid foil trailing edge portions 466a and 466b form the trailing edge 466 of the fluid foil 400. Overlapping the first and second longitudinal edges 465a and 465b as illustrated preferably permits the first and second longitudinal edges 465a and 465b to slidably engage one another when the leading edge structure (not illustrated) is rotated thereby causing the skin portions 450a and 450b to shift in the direction of the arrows illustrated in FIGS. 4A and 4B.

Figure 4A:
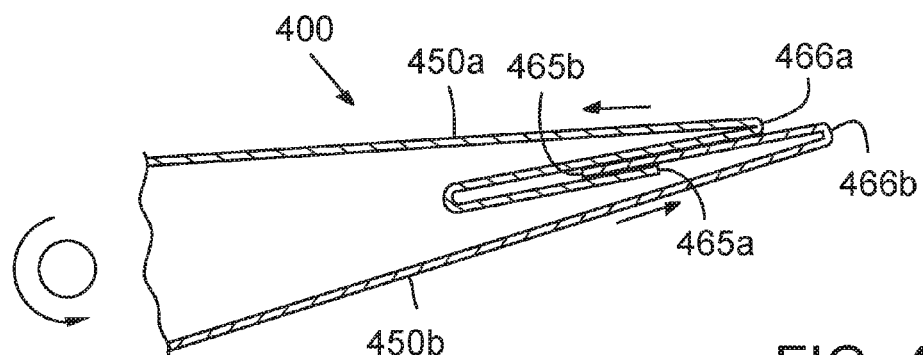
FIG. 4A illustrates a sectional detail of the trailing edges of the fluid foil illustrated in FIG. 4 with one side of the skin shifted towards the leading edge and one side of the skin shifted away from the leading edge.
Figure 4B:
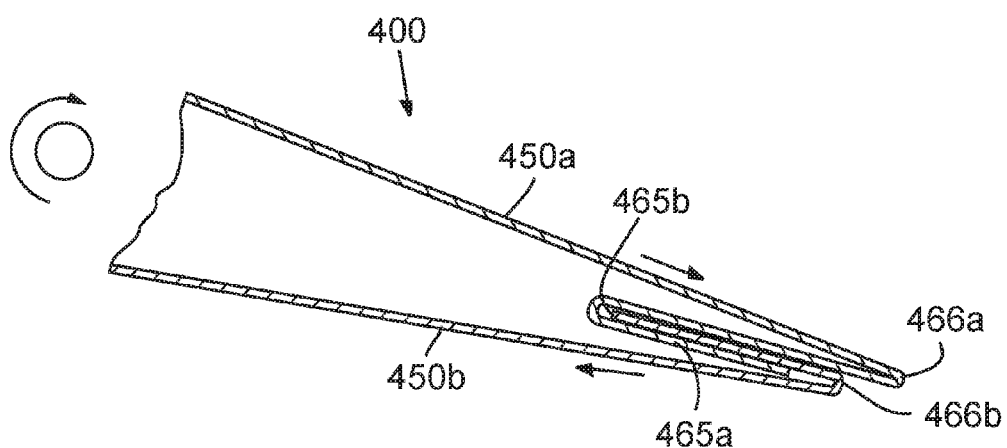
FIG. 4B illustrates a sectional detail of the trailing edges of the fluid foil illustrated in FIG. 4 with the two sides of the skin shifted in opposite directions from that illustrated in FIG. 4A.

FIG. 4A illustrates the trailing edge 466 with the leading edge structure (not illustrated) rotated in a first direction which pulls the skin portion 450a towards the leading edge and pushes the skin portion 450b away from the leading edge. The trailing edges 465a and 465b slide with respect to one another, thus permitting the skin portions 450a and 450b to shift. FIG. 4B illustrates the trailing edge 466 with the leading edge structure (not illustrated) rotated in a second direction opposite to the first direction which pushes the skin portion 450a away from the leading edge and pulls the skin portion 450b towards the leading edge. The trailing edges 465a and 465b again slide with respect to one another, thus permitting the skin portions 450a and 450b to shift.

Figure 5:
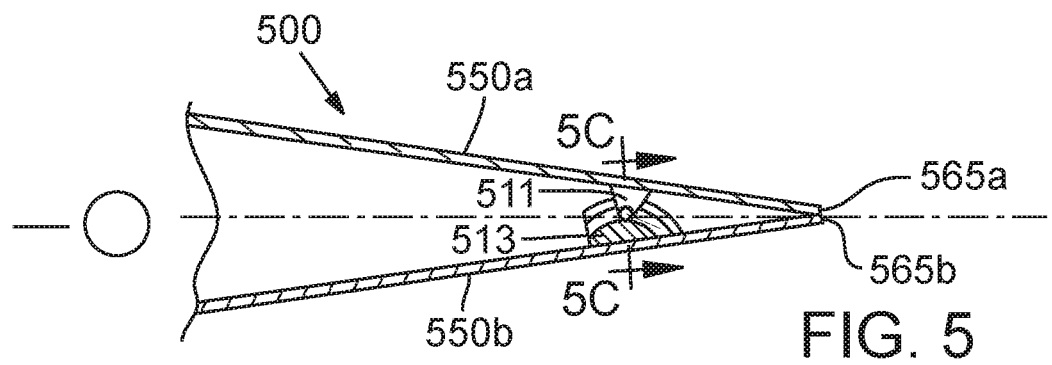
FIG. 5 illustrates a sectional detail of the trailing edges of a fluid foil skin coupled together by a sliding link.
Figure 5A:
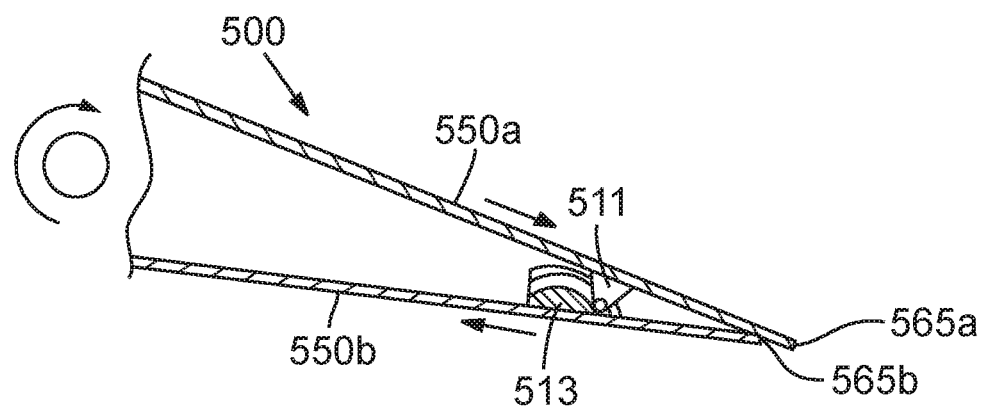
FIG. 5A illustrates a sectional detail of the trailing edges of the fluid foil illustrated in FIG. 5 with one side of the skin shifted towards the leading edge and one side of the skin shifted away from the leading edge.
Figure 5B:
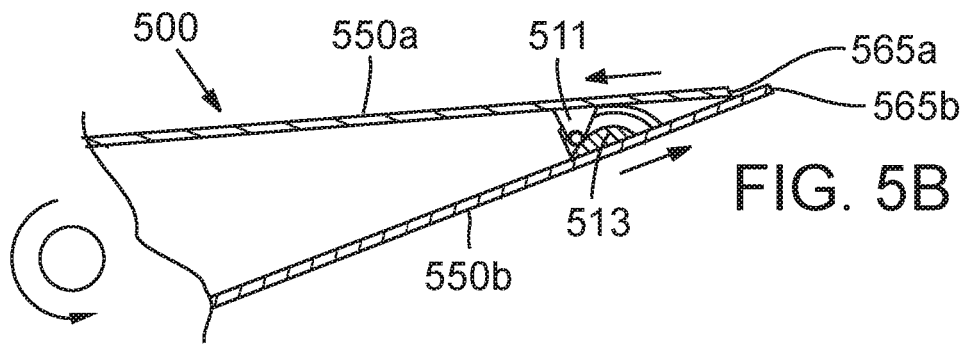
FIG. 5B illustrates a sectional detail of the trailing edges of the fluid foil illustrated in FIG. 5 with the two sides of the skin shifted in opposite directions from that illustrated in FIG. 5A.
Figure 5C:
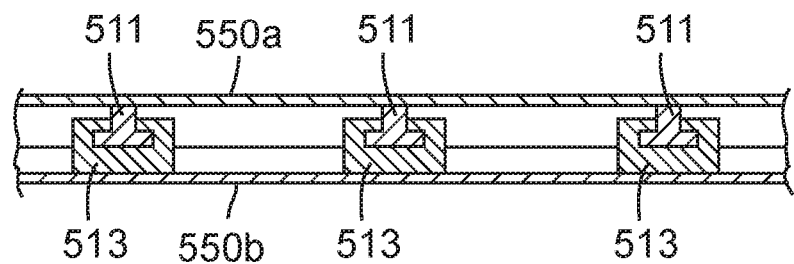
FIG. 5C illustrates a cross sectional view taken along line 5C-5C in FIG. 5.

FIGS. 5-5C illustrate another slidable structure for slidably engaging the trailing edges 565a and 565b, specifically by coupling the longitudinal trailing edges 565 of the skin 550 using a sliding link 510. A portion of the skin 550a that is proximate the first longitudinal edge 565a includes a plurality of "T" shaped posts 511. A second portion of the skin 550b includes a plurality of brackets 513 that the "T" shaped posts 511 slide in. Together, the fluid foil trailing edge portions 566a and 566b form the trailing edge 566 of the fluid foil 500. Including the "T" shaped posts 511 slidably retained in the brackets 513 permits the trailing edges 565a and 565b to slidably engage one another when the leading edge structure (not illustrated) is rotated and causes the skin portions 550a and 550b to shift in the direction of the arrows illustrated in FIGS. 5A and 5B.

FIG. 5A illustrates the trailing edge 565 with the leading edge structure (not illustrated) rotated in a first direction which pushes the skin portion 550a away from the leading edge and pulls the skin portion 550b towards the leading edge. The trailing edges 565a and 565b slide with respect to one another, thus permitting the skin portions 550a and 550b to shift. FIG. 5B illustrates the trailing edge 565 with the leading edge structure (not illustrated) rotated in a second direction opposite to the first direction which pulls the skin portion 550a towards the leading edge and pushes the skin portion 550b away from the leading edge. The trailing edges 565a and 565b again slide with respect to one another, thus permitting the skin portions 550a and 550b to shift.

FIG. 5C illustrates a cross-sectional view of the "T" shaped posts 511 slidably engaging the brackets 513. The "T" shaped posts 511 are rigidly attached to the skin portion 550a, for example by welding, gluing, bolting, or other suitable attachment. Likewise, the brackets 513 are rigidly attached to the skin portion 550b. When the trailing edges 565a and 565b are brought together, the "T" shaped posts 511 are guided into the brackets 513. Preferably, the brackets 513 are long enough to accommodate sliding movement between the trailing edges 565a and 565b without the "T" shaped posts 511 disengaging from either end of the brackets 513.

Figure 10:
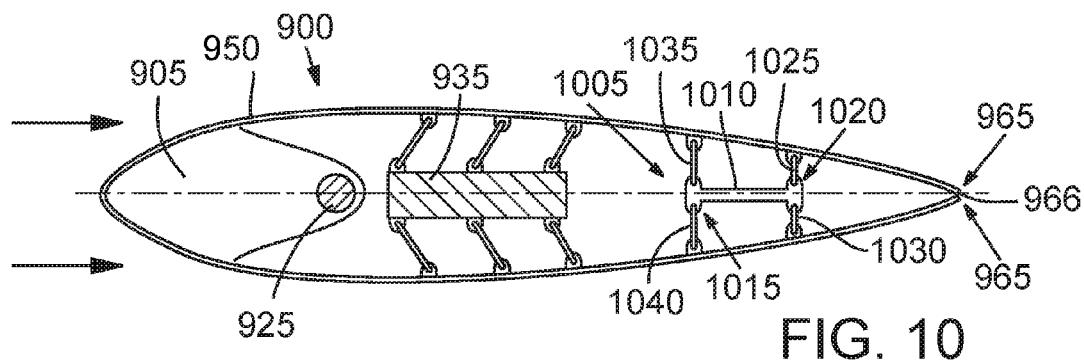
FIG. 10 illustrates an exemplary link for maintaining the first and second trailing edges of the skin proximate one another.

While the sliding link structure 510 illustrated in FIGS. 5-5C is shown proximate the trailing edges 565 of the skin 550, a sliding link structure may be modified to be located closer to the spar, for example, near the position where the link 1005 is illustrated in FIG. 10. Some embodiments may include a link, or other suitable structure, between the spar and the trailing edge of a fluid foil and a slidable structure proximate the trailing edge of the fluid foil.

Figure 5D:
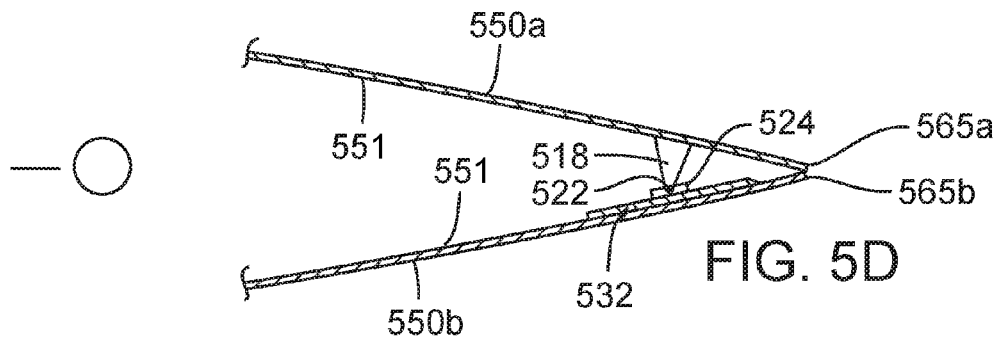
FIG. 5D illustrates a sectional detail of the trailing edges of a fluid foil skin coupled together by a magnetic link.

FIG. 5D illustrates another slidable structure for slidably engaging the trailing edges 565. A strip of magnetic material 532 is attached to the inside surface 551 of the skin portion 550b proximate the trailing edge 565b. Alternately, the skin portion 550b may include a magnetic material, and a separate strip of magnetic material may not be needed. A magnet 524, or series of magnets 524, is attached to the inside surface 551 of the skin portion 550a proximate the trailing edge 565a. The magnets 524 may be rotatably attached to a post 518, for example by a ball and socket 522 or other suitable rotatable attachment. The post 518 is preferably rigidly attached to the skin portion 550a, for example, by welding, gluing, bolts, or other suitable attachment. Alternately, the magnets 524 may be attached directly to the skin portion 550a. Preferably, the magnets 524 are strong enough to retain the trailing edges 565 proximate one another, but weak enough to permit the trailing edges 565 to slide with respect to one another when the leading edge structure (not illustrated) is rotated.

Figure 5E:
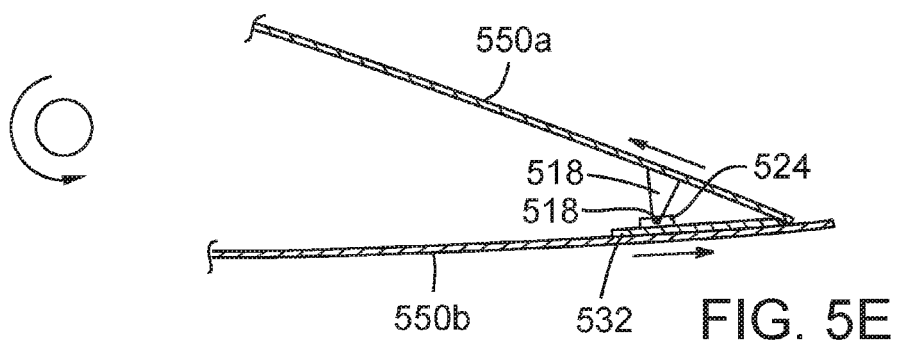
FIG. 5E illustrates a sectional detail of the trailing edges of the fluid foil illustrated in FIG. 5D with one side of the skin shifted towards the leading edge and one side of the skin shifted away from the leading edge.
Figure 5F:
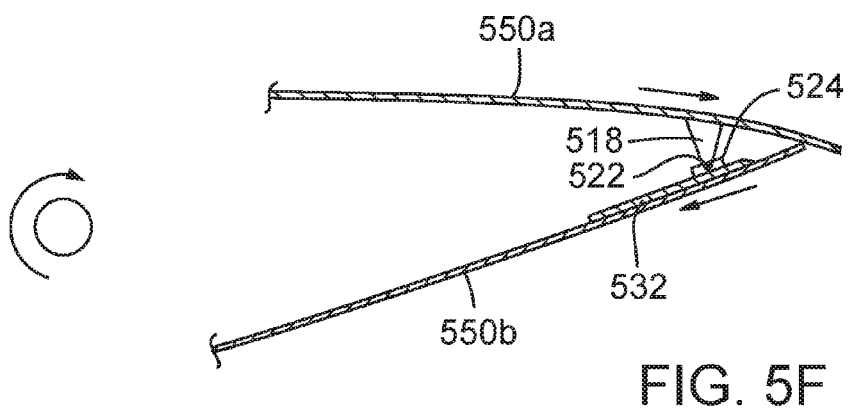
FIG. 5F illustrates a sectional detail of the trailing edges of the fluid foil illustrated in FIG. 5D with the two sides of the skin shifted in opposite directions from that illustrated in FIG. 5E.

FIG. 5E illustrates the trailing edge 565 with the leading edge structure (not illustrated) rotated in a first direction which pulls the skin portion 550a towards the leading edge and pushes the skin portion 550b away from the leading edge. The trailing edges 565a and 565b slide with respect to one another, thus permitting the skin portions 550a and 550b to shift. FIG. 5F illustrates the trailing edge 565 with the leading edge structure (not illustrated) rotated in a second direction opposite to the first direction which pushes the skin portion 550a away from the leading edge and pulls the skin portion 550b towards the leading edge. The trailing edges 565a and 565b again slide with respect to one another, thus permitting the skin portions 550a and 550b to shift. Preferably, the magnetic material 532 is wide enough to accommodate sliding movement between the trailing edges 565a and 565b without the magnets 524 disengaging from the magnetic material 532.

Fluid Pressure

Figure 6:
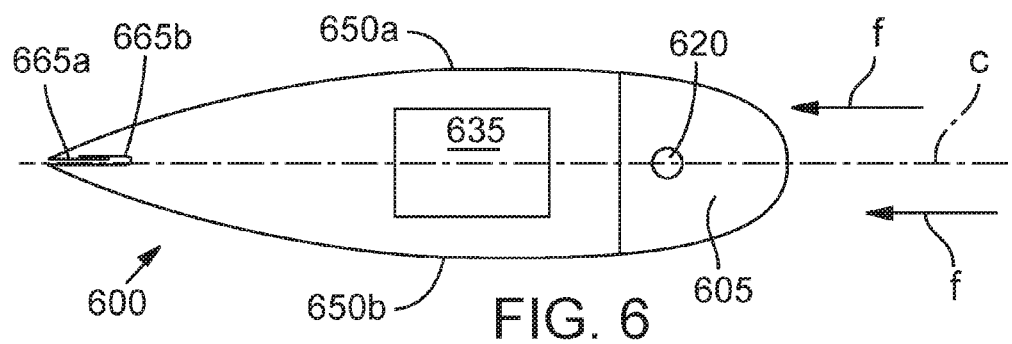
FIG. 6 illustrates a sectional view of a fluid foil.

FIG. 6 illustrates the fluid foil 600 in an initial, or un-rotated, position. Note that a gap is illustrated between 650a and 650b where they meet to form the trailing edge of the foil 600. The gap is included for clarity of illustration, and such a gap may or may not actually exist on a fluid foil depending on intended design, tolerances, or other suitable factors.

The fluid foil 600 is symmetric with respect to centerline "C," and fluid "f" flowing in the direction of arrows "f" exerts equal, or nearly equal, pressure on skin sides 650a and 650b. Rotating the axle 620 with respect to the spar 635 in the direction of the arrow "r" illustrated in FIG. 7 changes the angle of attack of the fluid foil 600 with respect to the fluid flow "f." The fluid foil 600 is no longer symmetric with respect to the centerline "C." As illustrated, rotating the axle 620 in the direction of the arrow "r" pulls on the skin side 650a and pushes on the skin side 650b, thereby increasing the curvature of the skin side 650a and decreasing the curvature of the skin side 650b.

Alternately, the skin may be constructed to decrease the curvature of the side 650a and increase the curvature of side 650b when the axle 620 rotates in the direction "r," a spacing device may be included to cause the skin sides 650a, 650b, or both, to be desirably spaced from the spar 635, or both a spacing device and skin construction may be used. Whether and how the curvature of the skin sides 650a and 650b changes when the leading edge structure 605 rotates may therefore depend on the material composition of the skin 650, the thickness of the skin 650, the relative speed of the fluid foil 600 through the fluid "f," the density of the fluid "f," whether a spacing device is attached between the spar 635 and the skin 650, or any of these factors in any combination. Spacing devices are described below. The longitudinal trailing edges 665a and 665b slide with respect to one another to accommodate the pulling and pushing on the skin sides 650a and 650b, respectively.

Figure 7:
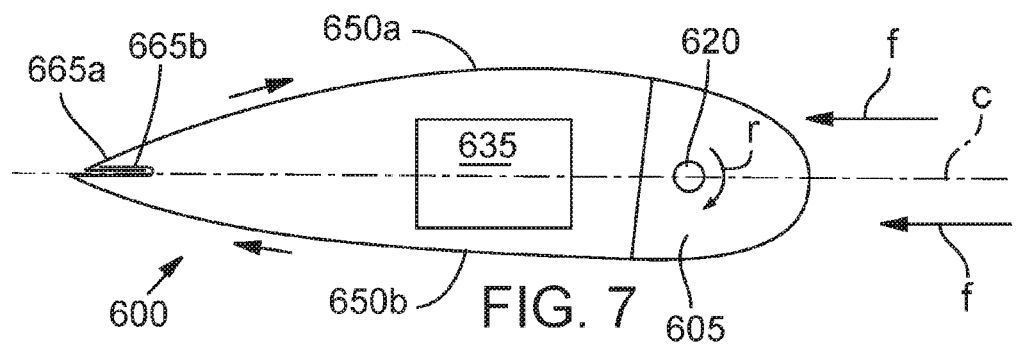
FIG. 7 illustrates a sectional view of the fluid foil of FIG. 6 with the fluid foil contour shifted in a first direction.
Figure 8:
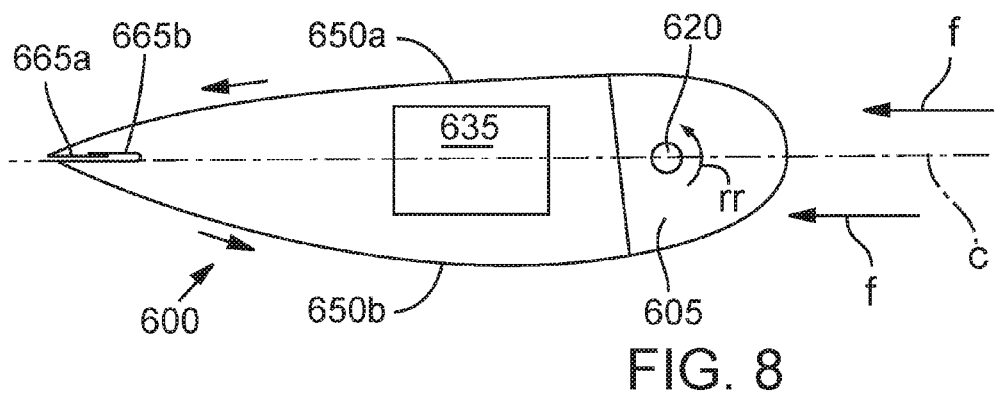
FIG. 8 illustrates a sectional view of the fluid foil of FIG. 6 with the fluid foil contour shifted in a second direction.

Rotating the axle 620 with respect to the spar 635 in the direction of the arrow "rr" illustrated in FIG. 8 changes the angle of attack of the fluid foil 600 with respect to the fluid flow "f" in a direction opposite that illustrated in FIG. 7. The fluid foil 600 is again not symmetric with respect to the centerline "C." As illustrated, rotating the axle 620 in the direction of the arrow "rr" pushes on the skin side 650a and pulls on the skin side 650b, thereby decreasing the curvature of the skin side 650a and increasing the curvature of the skin side 650b. The longitudinal trailing edges 665a and 665b again slide with respect to one another to accommodate the pushing and pulling on the skin sides 650a and 650b, respectively.

As illustrated in FIGS. 6-8, changing the angle of attack, the curvature of the skin sides 650*a* and 650*b* by rotating the axle 620, or both, permits the flowing fluid "f" to exert 1) relatively even pressure on the skin sides 650*a* and 650*b*, 2) more pressure on the skin side 650*a* than on the skin side 650*b*, or 3) more pressure on the skin side 650*b* than on the skin side 650*a*. By altering the amount of pressure exerted on the skin sides 650*a* and 650*b*, rotating the axle 620 permits control of the body attached to the fluid foil 600.

For example, a fluid foil 600 used as a forward dive plane on a submarine may be operated in the following manner. When sailing at a constant depth, the fluid foil 600 is configured as illustrated in FIG. 6 to reduce the amount of drag created by the fluid foil 600. When diving, the fluid foil 600 is configured as illustrated in FIG. 7 so the increased pressure on the skin side 650*a* pushes the submarine away from the water's surface. When surfacing, the fluid foil 600 is configured as illustrated in FIG. 8 so the increased pressure on the skin side 650*b* pushes the submarine towards the water's surface. A spacing device, examples are described below, attached to the spar 635 may assist with altering the curvature, or substantially retaining the curvature, of the skin sides 650*a* and 650*b* when the axle 620 is rotated.

Figure 6A:
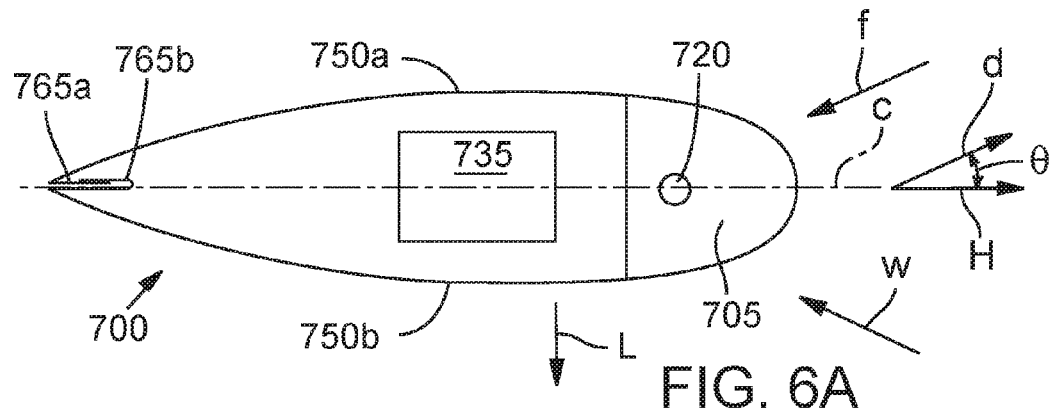
FIG. 6A illustrates a sectional view of a fluid foil used as a sailboat keel.
Figure 7A:
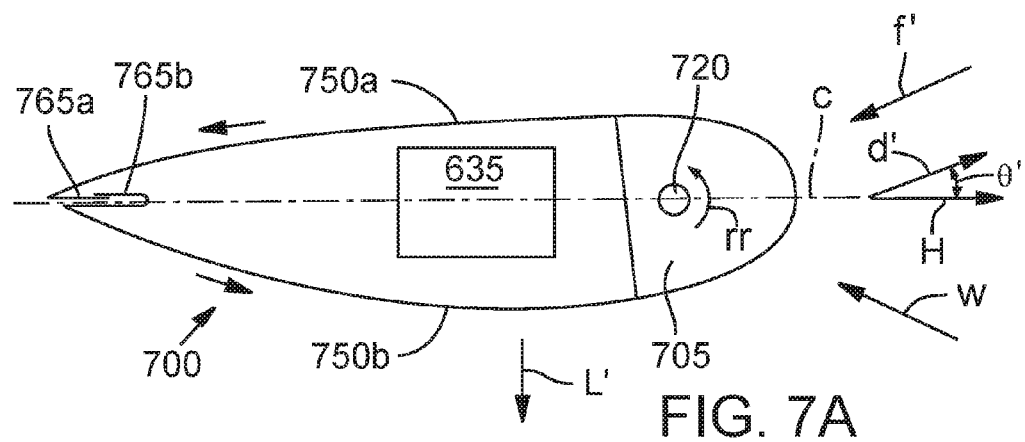
FIG. 7A illustrates a sectional view of the fluid foil of FIG. 6A with the fluid foil contour shifted in a first direction.

Applying a shape shifting foil 700 in a sailboat keel is illustrated in FIGS. 6A-8A. FIGS. 6A and 7A illustrate sailing on a starboard tack where the sailboat includes fluid foil 700 as part of the keel. The wind "W" approaches the sailboat from the starboard side, and the sails are set in a known manner to sail into the wind "W." The heading of the sailboat is indicated by arrow "H" and indicates the direction the bow of the sailboat points. Because of the aerodynamic and hydrodynamic forces acting on the sailboat, the sailboat does not move in the direction of arrow "H," but moves in a direction indicated by arrow "d." An angle $\theta$ indicates the angular difference between the sailboat's heading "H" and actual direction "d." Because "d" is the direction the sailboat moves, fluid, in this case water, approaches the fluid foil 700 from a direction indicated by arrow "f" (assuming there are no currents or other movements of the water).

In the configuration illustrated in FIG. 6A, the fluid foil 700 is substantially symmetric in shape about the centerline "C." Because of the contour of the fluid foil 700, that is, the shape exhibited by the outer skin 750, water flowing in the direction "f" creates a lift component, in this case, a force that alters the sailboat's direction of travel closer to the sailboat's heading "H." Maintaining the same heading "H" and assuming the wind direction and speed remain constant, shifting the shape of the fluid foil 700 may further alter the direction "d" that the sailboat moves to be closer to the heading "H," and possibly more into the wind than the heading "H."

As illustrated in FIG. 7A, the axle 720 is rotated in the direction "rr" to adjust the angle of attack of the leading edge section 705 with respect to the water direction "f." At the same time, the skin portion 750*a* is pushed and thereby flattened while the skin portion 750*b* is pulled and thereby has an increased curvature. Rotating the axle 720 in the direction "rr" may therefore change the angle of attack and the camber of the fluid foil 700. The changed angle of attack and camber illustrated in FIG. 7A create a stronger lift component L' than the lift component "L" illustrated in FIG. 6A. The direction d' that the sailboat moves in FIG. 7A is therefore closer to the heading "H" than the direction d that the sailboat moves in FIG. 6A, in other words, $\theta'$ is smaller than $\theta$. In some instances, d' may possibly cross "H" thus creating a negative $\theta$.

Figure 8A:
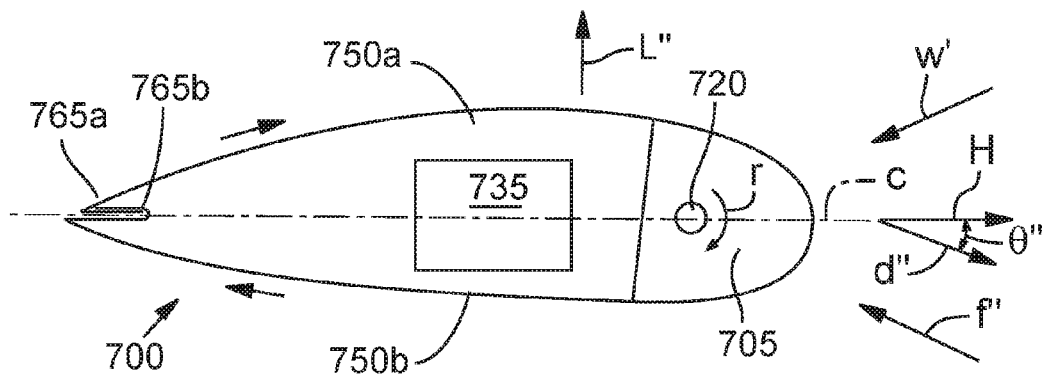
FIG. 8A illustrates a sectional view of the fluid foil of FIG. 6A with the fluid foil contour shifted in a second direction.

The fluid foil 700 configuration illustrated in FIG. 8A represents a shifted shape for the fluid foil 700 when the sailboat sails a port tack. The lift component L" is in the opposite direction from the lift component L' illustrated in FIG. 7A.

Figure 9:
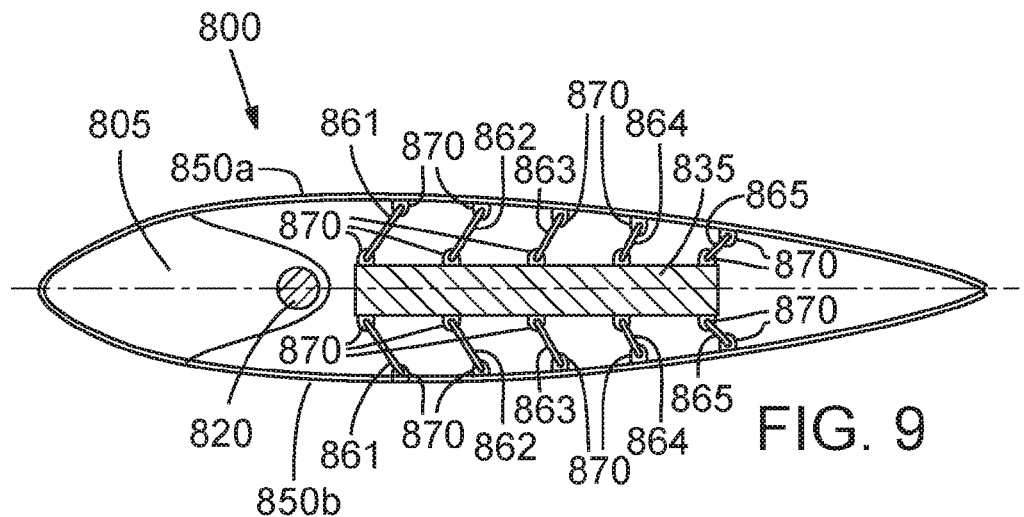
FIG. 9 illustrates a sectional view of a fluid foil including a spacing device.
Figure 9A:
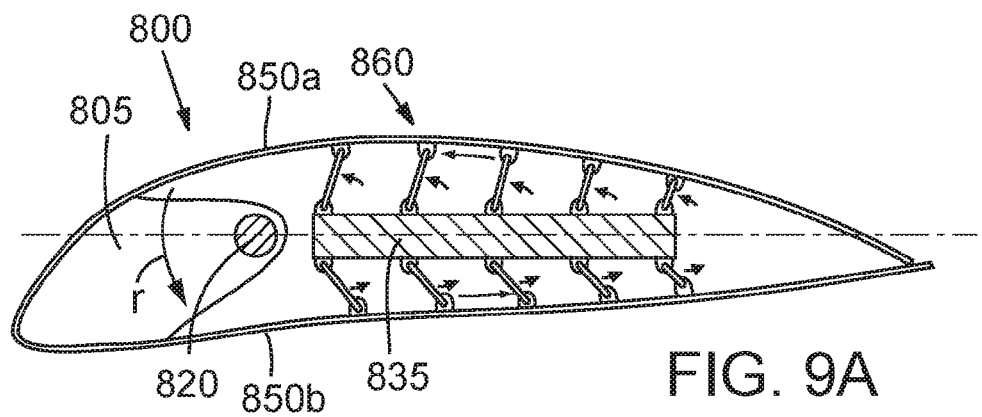
FIG. 9A illustrates a sectional view of the fluid foil of FIG. 9 with the fluid foil contour shifted and with the spacing device shifted in a first direction.
Figure 9B:
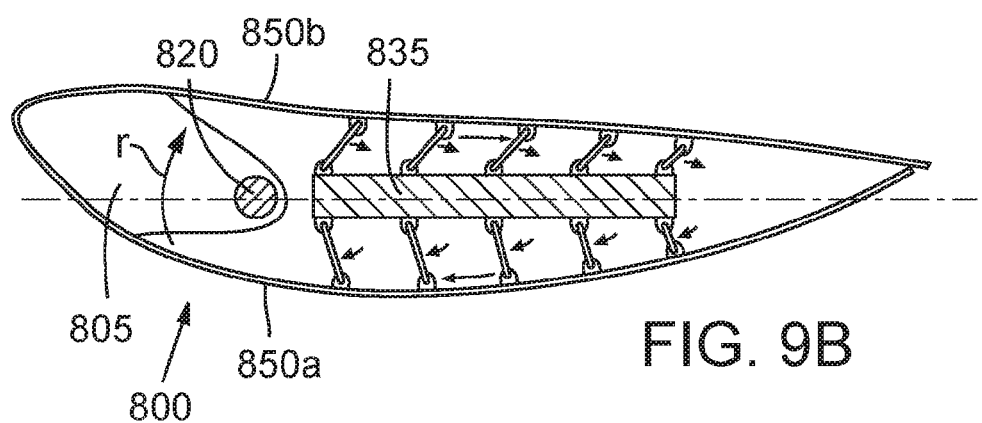
FIG. 9B illustrates a sectional view of the fluid foil of FIG. 9 with the fluid foil contour shifted and with the spacing device shifted in a second direction.

FIGS. 9, 9A, and 9B illustrate a cross section of a fluid foil 800 including a spacing device 860 attached to the spar 835. The spacing device 860 includes a plurality of rigid arms 861-865. The rigid arms are preferably arranged in rows running the longitudinal length of the spar 835, that is, from the root section to the tip end. Alternately, in place of the rigid arms 861-865, the spacing device 860 may include semi-rigid arms that are bendable along the entire length of the arm, or are bendable only proximate the ends of the arm. Semi-rigid arms may be rotatably attached to the spar 835, the skin 850, or may be non-rotatably attached to the spar 835, or the skin 850, or a combination of rotatable and non-rotatable attachments may be used.

In the exemplary embodiment, a row of rigid arms 861 is located on one side of the spar 835, and a second row of rigid arms 861 is located on an opposite side of the spar 835. Likewise, dual rows of rigid arms 862, 863, 864, and 865 are located on opposite sides of the spar 835. The spar 835 may be divided into sections, and the rigid arms 861-865 may be located in specific sections. For example, a leading section may include the first third of the spar 835 that is closest to the leading edge structure 805, a mid section may include the middle third of the spar 835, and a trailing section may include the remaining third of the spar 835, that is, the third of the spar 835 furthest from the leading edge structure 805. More or fewer rows of rigid arms may be used in alternate embodiments.

Preferably, the rigid arms 861-865 that are in a single row are all the same length. Therefore, each rigid arm 861 is preferably the same length as the other rigid arms 861, and so on for the rigid arms 862-865. However, the rigid arms in different rows may be of different lengths, the rigid arms in a single row may be of varying lengths, or both. For example, the rigid arms 861 may be shorter than the rigid arms 862, which in turn may be longer than the rigid arms 863, which in turn may be longer than the rigid arms 864, which in turn may be longer than the rigid arms 865. Alternately, any of the rigid arms 861-865 may be the same length, or different lengths.

Each rigid arm 861-865 may have a first end rotatably attached to the spar 835 and a second end rotatably attached to the skin 850. For example, hinges 870, which may be similar to a door or cabinet hinge, a piano hinge, or other suitable hinge, may be connected between each rigid arm 861-865 and the spar 835. Likewise, hinges 870 may be connected between each rigid arm 861-865 and the skin 850. Other suitable rotatable attachments may be used, for example, but not limited to, a pin, ball and socket joints, and living hinges. Rigid arms may be connected to spar 835 at any angular relationship.

FIG. 9A illustrates the contour of the fluid foil 800 after the axle 820 is rotated in the direction of arrow "r." The leading edge structure 805 is rotated, thereby pulling on the skin portion 850*a* and pushing on the skin portion 850*b*. As the skin portion 850*a* is pulled towards the axle 820, the rigid arms 861-865 connected between the spar 835 and the skin portion 850*a* rotate to a position where the rigid arms 861-865 are more orthogonal to the spar 835. Because each rigid arm 861-865 is connected to the skin portion 850*a*, each rigid arm 861-865 pushes the skin portion 850*a* into a contour for the fluid foil 800. The contour of the skin portion 850*a* in FIG. 9A exhibits greater camber as compared to FIG. 9, as portions of the skin portion 850*a* are pushed farther from the spar 835.

Likewise, the skin portion 850*b* in FIG. 9A exhibits a changed camber as compared to FIG. 9. However, portions of the skin portion 850*b* are pulled closer to the spar 835. When the axle 820 is rotated in the direction of arrow "r," the rigid arms 861-865 connected between the spar 835 and the skin portion 850*b* rotate to a position where the rigid arms 861-865 are more parallel to the spar 835. Because each rigid arm 861-865 is connected to the skin portion 850*b*, the skin portion 850*b* is pulled towards the spar 835 when the rigid arms 861-865 rotate. Rotating the axle 820 in a direction opposite the arrow "r," as illustrated in FIG. 9B, results in a similar change to the camber of the skin 850*a* and 850*b*, but reverse of what is illustrated in FIG. 9A.

Figure 9C:
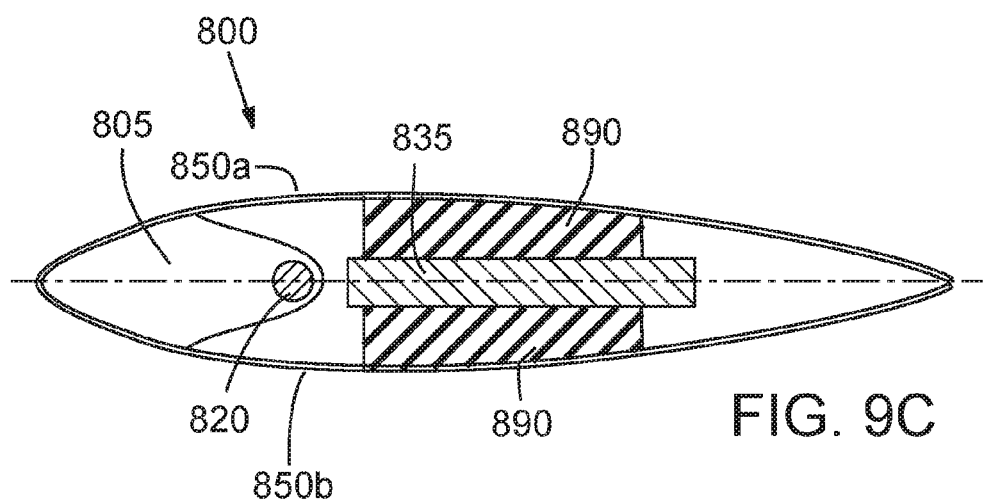
FIG. 9C illustrates a sectional view of a fluid foil including another spacing device.
Figure 9D:
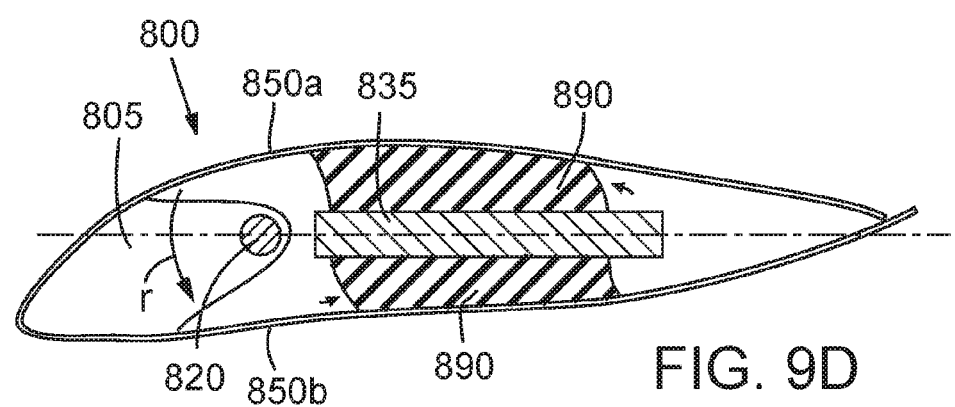
FIG. 9D illustrates a sectional view of the fluid foil of FIG. 9C with the fluid foil contour shifted and with the spacing device shifted in a first direction.
Figure 9E:
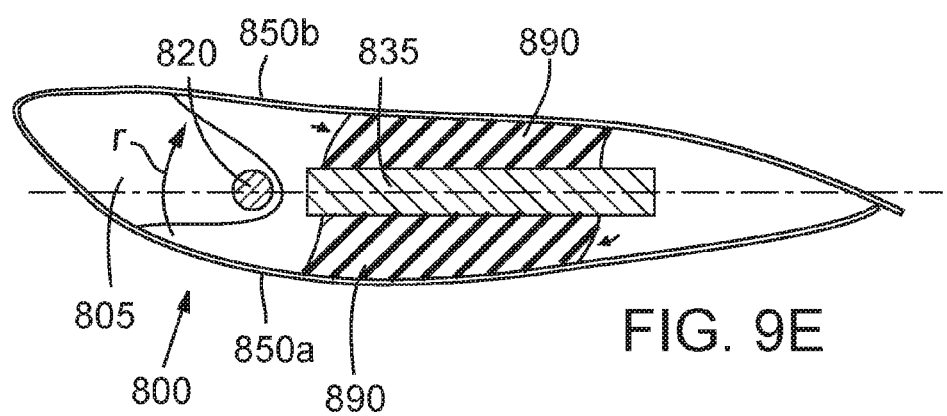
FIG. 9E illustrates a sectional view of the fluid foil of FIG. 9C with the fluid foil contour shifted and with the spacing device shifted in a second direction.

Depending on the desired changes to the camber of the fluid foil 800, the number, placement, or length of the rigid arms 861-865, singularly or in any combination, may be modified. Alternate embodiments may use different spacing devices. For example, FIGS. 9C-9E illustrate a spacing device that includes two deformable spacers 890. The deformable spacers 890 preferably provide some resistance against the skin 850 moving towards and away from the spar 835, but do not prevent the skin 850 from moving towards and away from the spar 835. The deformable spacers 890 may be attached to the spar 835 and the skin 850, for example by gluing, adhesive, bolt, rivets, or other suitable attachment. The deformable spacers 890 are preferably made from a material exhibiting elastic deformation, such as natural rubber, Ultra Foam™ from American Micro Industries, Inc. of Chambersburg, Pa., or other suitable material.

Figure 9F:
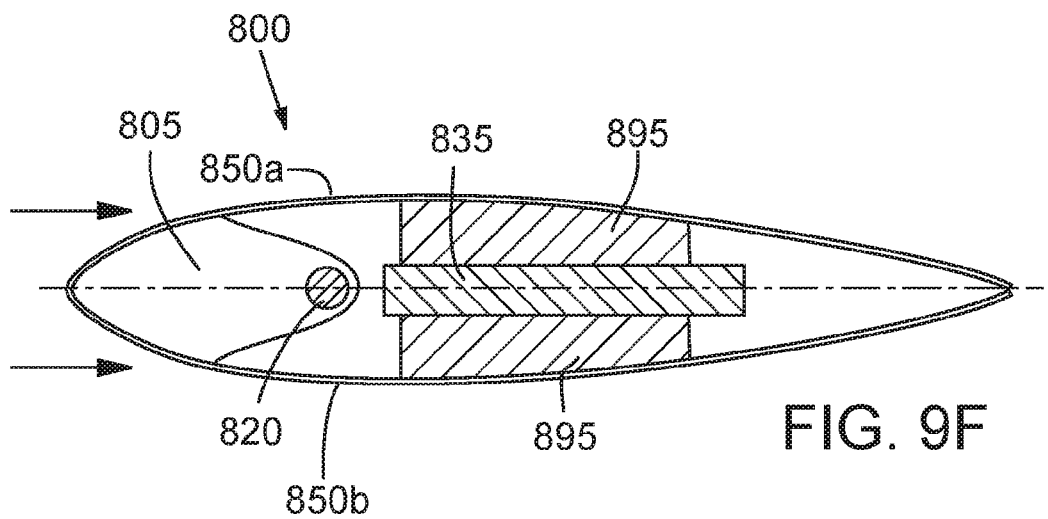
FIG. 9F illustrates a sectional view of a fluid foil including another spacing device.
Figure 9G:
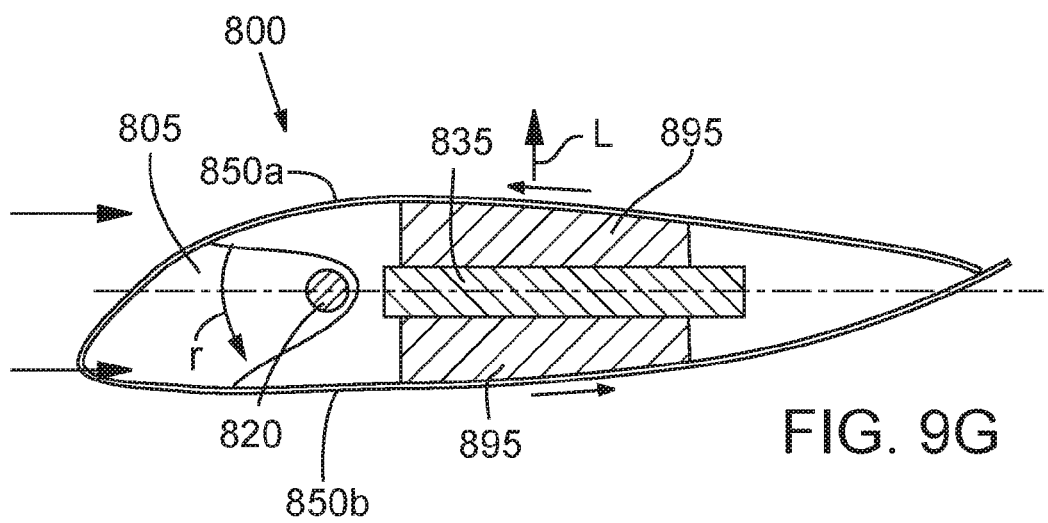
FIG. 9G illustrates a sectional view of the fluid foil of FIG. 9F with the fluid foil contour shifted in a first direction.
Figure 9H:
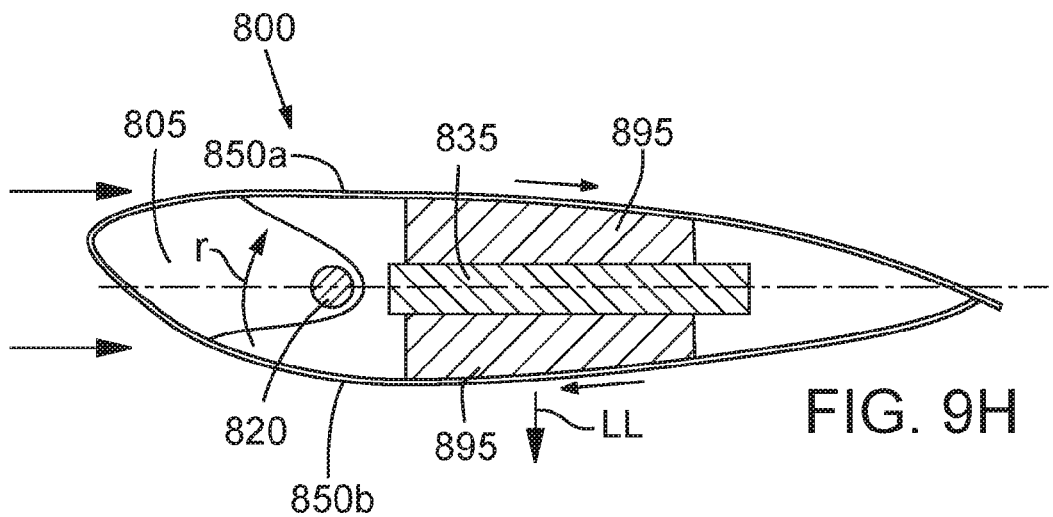
FIG. 9H illustrates a sectional view of the fluid foil of FIG. 9F with the fluid foil contour shifted in a second direction.

Another example is illustrated in FIGS. 9F-9H that includes a spacing device with two rigid spacers 895 that the skin 850 slides over. The rigid spacers 895 may be attached to the spar 835, but not attached to the skin 850. Because the two rigid spacers 895 do not readily deform, the contour of the airfoil 800 remains substantially the same when the axle 820 is rotated, with the angle of attack altered.

Figure 9I:
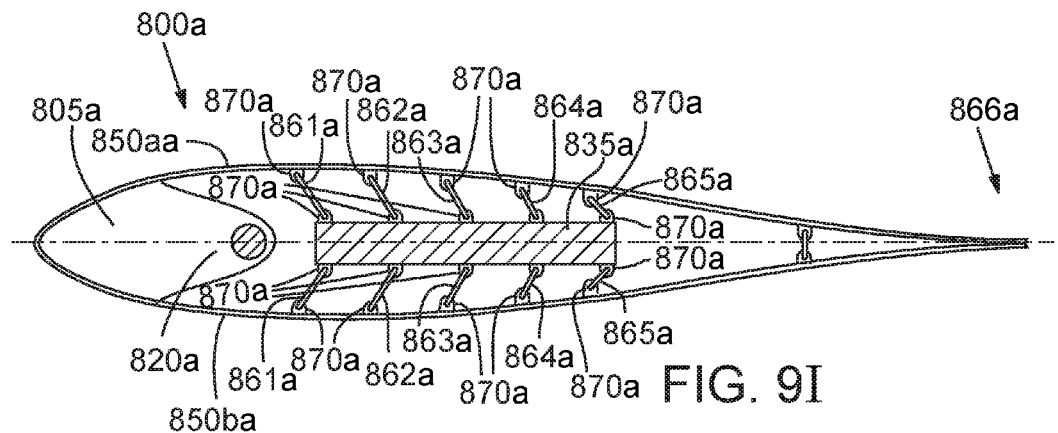
FIG. 9I illustrates a sectional view of a fluid foil including another spacing device.
Figure 9J:
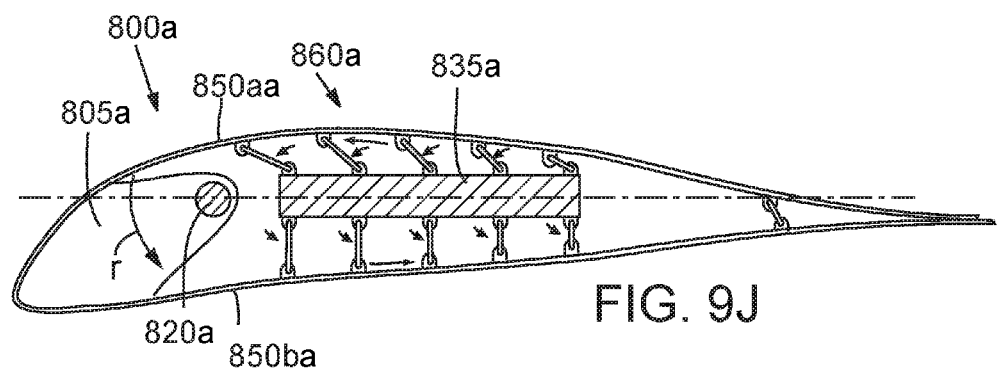
FIG. 9J illustrates a sectional view of the fluid foil of FIG. 9I with the fluid foil contour shifted and with the spacing device shifted in a first direction.
Figure 9K:
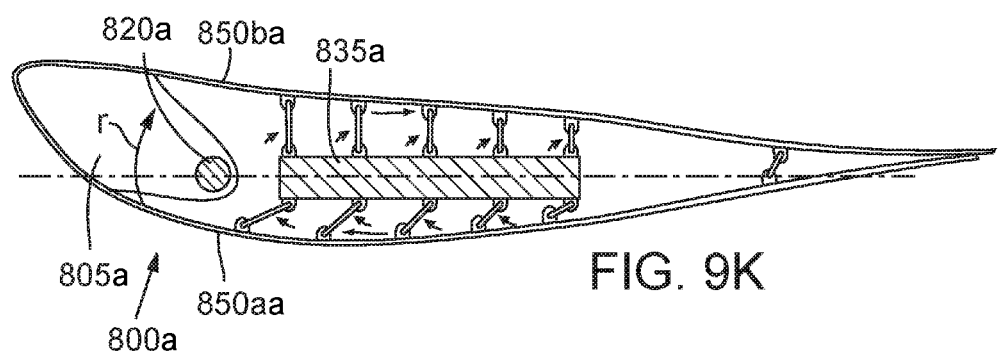
FIG. 9K illustrates a sectional view of the fluid foil of FIG. 9I with the fluid foil contour shifted and with the spacing device shifted in a second direction.

Another example is illustrated in FIGS. 9I-9K that includes rigid arms 861*a*-865*a* in a different attachment configuration from that illustrated in FIGS. 9-9B. The spacing device 860*a* includes a plurality of rigid arms 861*a*-865*a*. The rigid arms 861*a*-865*a* are preferably arranged in rows running the longitudinal length of the spar 835, that is, from the root section to the tip end. Other suitable structures may be substituted in place of, or in conjunction with, rigid arms 861*a*-865*a*.

The fluid foil 800*a* exhibits a contour having a constricted, or "pinched" section between the spar 835*a* and the trailing edge . Such a constriction may be included by using a link to alter the curvature of the skin 850*aa* and 850*ba*. Links may be located at various locations, and may be used to "pinch" or to expand the skin to alter the shape of a fluid foil.

Preferably, a row of rigid arms 861*a* is located on one side of the spar 835*a*, and a second row of rigid arms 861*a* is located on an opposite side of the spar 835*a*. Likewise, dual rows of rigid arms 862*a*, 863*a*, 864*a*, and 865*a* are located on opposite sides of the spar 835*a*. The spar 835*a* may be divided into sections, and the rigid arms 861*a*-865*a* may be located in specific sections. For example, a leading section may include the first third of the spar 835*a* that is closest to the leading edge structure 805*a*, a mid section may include the middle third of the spar 835*a*, and a trailing section may include the remaining third of the spar 835*a*, that is, the third of the spar 835*a* furthest from the leading edge structure 805*a*. More or fewer rows of rigid arms may be used in alternate embodiments.

Preferably, the rigid arms 861*a*-865*a* that are in a single row are all the same length. Therefore, each rigid arm 861*a* is preferably the same length as the other rigid arms 861*a*, and so on for the rigid arms 862*a*-865*a*. However, the rigid arms in different rows may be of different lengths, or the rigid arms in a single row may be of varying lengths, or both. For example, the rigid arms 861*a* may be longer than the rigid arms 862*a*, which in turn may be longer than the rigid arms 863*a*, which in turn may be longer than the rigid arms 864*a*, which in turn may be longer than the rigid arms 865*a*. Alternately, any of the rigid arms 861*a*-865*a* may be the same length, or different lengths.

Each rigid arm 861*a*-865*a* may have a first end rotatably attached to the spar 835*a* and a second end rotatably attached to the skin 850*a*. For example, hinges 870*a*, which may be similar to a door or cabinet hinge, may be connected between each rigid arm 861*a*-865*a* and the spar 835*a*. Likewise, hinges 870*a* may be connected between each rigid arm 861*a*-865*a* and the skin 850*a*. Other suitable rotatable attachments may be used, for example, but not limited to, a pin, ball and socket joints, and living hinges.

FIG. 9J illustrates the contour of the fluid foil 800*a* after the axle 820*a* is rotated in the direction of arrow "r." The leading edge structure 805*a* is rotated, thereby pulling on the skin portion 850*aa* and pushing on the skin portion 850*ba*. As the skin portion 850*aa* is pulled towards the axle 820*a*, the rigid arms 861*a*-865*a* connected between the spar 835*a* and the skin portion 850*aa* rotate to a position where the rigid arms 861*a*-865*a* are less orthogonal to the spar 835*a*. Because each rigid arm 861*a*-865*a* is connected to the skin portion 850*aa*, each rigid arm 861*a*-865*a* pulls the skin portion 850*aa* into a contour for the fluid foil 800*a*. The contour of the skin portion 850*aa* in FIG. 9J exhibits greater camber as compared to FIG. 9I, as portions of the skin portion 850*aa* are pulled towards the spar 835*a*.

Likewise, the skin portion 850*ba* in FIG. 9J exhibits a changed camber as compared to FIG. 9L. However, portions of the skin portion 850*ba* are pushed farther from the spar 835*a*. When the axle 820*a* is rotated in the direction of arrow "r," the rigid arms 861*a*-865*a* connected between the spar 835*a* and the skin portion 850*ba* rotate to a position where the rigid arms 861*a*-865*a* are more orthogonal to the spar 835*a*. Because each rigid arm 861*a*-865*a* is connected to the skin portion 850*ba*, the skin portion 850*ba* is pushed away from the spar 835*a* when the rigid arms 861*a*-865*a* rotate. Rotating the axle 820*a* in a direction opposite the arrow "r," as illustrated in FIG. 9K, results in a similar change to the camber of the skin 850*aa* and 850*ba*, but reverse of what is illustrated in FIG. 9J. Note that the angle of attack also changes.

Another example is illustrated in FIGS. 9L and 9M with a spacing device 1400 that includes a carrier device 1405 attached to the spar 1410. Carrier device 1405 preferably substantially surrounds spar 1410 and preferably extends the length of spar 1410. Carrier device 1405 may include a box-like structure fabricated from sheet metal, plywood, rigid plastic, or other suitable material.

The spacing device 1400 also preferably includes an interface mechanism, such as geared interface 1415, for imparting rotational motion from axle 1420 to carrier device 1405. Preferably, a first portion of the interface mechanism is linked to axle 1420 for rotation therewith. For example, first geared portion 1416 preferably rotates with axle 1420 by being non-rotatably coupled to axle 1420 or to leading edge section 1425. A second portion of the interface mechanism, such as second geared portion 1417, engages the first portion of the interface mechanism and is preferably rotated by rotation of the first portion of the interface mechanism. The second portion of the interface mechanism is preferably rigidly attached to the carrier device 1405.

The spacing device 1400 includes a plurality of rigid arms 1430-1437 connected between spar 1410 and carrier device 1405 and connected between carrier device 1405 and skin 1446. The rigid arms 1430-1437 are preferably arranged in rows running the longitudinal length of the spar 1410, that is, from the root section to the tip end. Alternately, in place of the rigid arms 1430-1437, the spacing device 1400 may include semi-rigid arms that are bendable along the entire length of the arm, or are bendable only proximate the ends of the arm. Semi-rigid arms may be rotatably attached to the spar 1410, carrier device 1405, skin 1446, or may be non-rotatably attached to the spar 1410, carrier device 1405, skin 1446, or a combination of rotatable and non-rotatable attachments may be used.

Embodiments including a carrier device, such as carrier device 1405, preferably induce different changes in fluid foil features such as the angle of attack, camber, or fluid foil shape, singularly or in any combination, for a fluid foil, such as fluid foil 1440, compared to embodiments that do not include a carrier device. As illustrated in FIG. 9L, fluid foil 1440 has a zero angle of attack with respect to a fluid moving along the direction indicated by arrows "f." In other words, the chord "C," which is a line extending from the center of curvature of the leading edge 1445 to the trailing edge 1450, is at a zero angle with respect to arrows "f." As illustrated in FIG. 9M, rotating axle 1420 in the direction of arrows "r" pulls on skin 1446 on one side of fluid foil 1440 and pushes on skin 1446 on the opposite side of fluid foil 1440. Along with pushing and pulling on skin 1446, rotating axle 1420 in the direction "r" causes carrier device 1405 to rotate with respect to spar 1410. Through the combination of (a) rotating the leading edge structure 1425 and (b) displacing the location of rigid arms 1430-1433 with respect to spar 1410, the chord "C" is angularly off-set from the direction of arrows "f" and the shape of fluid foil 1440 is altered. In contrast, without the carrier device 1405, the rotation of the leading edge structure 1425 primarily contributes to angularly off-setting the chord "C" from the direction of arrows "f" and the shape of fluid foil 1440 would be different because the location of rigid arms 1430-1433 with respect to spar 1410 would not change. Rotation in the direction opposite "r" creates a similar, but reverse, change to the fluid foil features.

As with previous embodiments, the camber of fluid foil 1440 may or may not be altered when the leading edge structure 1425 is rotated, for example, by designing rigid arms 1430-1433 to retain the same, or substantially the same, camber before and after rotating leading edge structure 1425. One or more optional link structures 1455 may be attached between carrier device 1405 and skin 1446 to help keep the skin 1446 together at the trailing edge 1450.

Another example is illustrated in FIGS. 9N and 9O with a spacing device 1500 that includes a carrier device 1505 attached to the spar 1510 and a carrier device 1506 attached to the spar 1511. Carrier device 1505 preferably substantially surrounds spar 1510 and preferably extends the length of spar 1510. Carrier device 1506 preferably substantially surrounds spar 1511 and preferably extends the length of spar 1511. Carrier devices 1505 and 1506 may each include a box-like structure fabricated from sheet metal, plywood, rigid plastic, or other suitable material.

The spacing device 1500 also preferably includes an interface mechanism, such as geared interface 1515, for imparting rotational motion from axle 1520 to carrier devices 1505 and 1506. Preferably, a first portion of the interface mechanism is linked to axle 1520 for rotation therewith. For example, first geared portion 1516 preferably rotates with axle 1520 by being non-rotatably coupled to axle 1520 or to leading edge section 1525. A second portion of the interface mechanism, such as second geared portion 1517, engages the first portion of the interface mechanism and is preferably rotated by rotation of the first portion of the interface mechanism. The second portion of the interface mechanism is preferably rigidly attached to the carrier device 1505.

The spacing device 1500 preferably includes one or more link arms 1507 that transfer rotational movement of carrier device 1505 to carrier device 1506. Providing two, or more, carrier devices, such as carrier devices 1505 and 1506, preferably facilitates creating different fluid foil features, such as cambers, angles of attack, and fluid foil contours, singly or in any combination, when compared to providing a single carrier device, such as carrier device 1405 (FIGS. 9L and 9M), or no carrier device.

The spacing device 1500 also includes a plurality of rigid arms 1530-1537 connected between spars 1510 and 1511 and carrier devices 1505 and 1506 and connected between carrier devices 1505 and 1506 and skin 1546. The rigid arms 1530-1537 are preferably arranged in rows running the longitudinal length of the spars 1510 and 1511, that is, from the root section to the tip end. Alternately, in place of the rigid arms 1530-1537, the spacing device 1500 may include semi-rigid arms that are bendable along the entire length of the arm, or are bendable only proximate the ends of the arm. Semi-rigid arms may be rotatably attached to one or more of the spars 1510 and 1511, carrier devices 1505 and 1506, and skin 1546, or may be non-rotatably attached to one or more of the spars 1510 and 1511, carrier devices 1505 and 1506, and skin 1546, or a combination of rotatable and non-rotatable attachments may be used.

Embodiments including a carrier device, such as carrier devices 1505 and 1506, preferably induce different fluid foil features for a fluid foil, such as fluid foil 1540, compared to embodiments that do not include a carrier device. As illustrated in FIG. 9N, fluid foil 1540 has a zero angle of attack with respect to a fluid moving along the direction indicated by arrows "f." As illustrated in FIG. 9O, rotating axle 1520 in the direction of arrows "r" pulls on skin 1546 on one side of fluid foil 1540 and pushes on skin 1546 on the opposite side of fluid foil 1540. Along with pushing and pulling on skin 1546, rotating axle 1520 in the direction "r" causes carrier device 1505 to rotate with respect to spar 1510. Rotating axle 1520 in the direction "r" also causes carrier device 1506 to rotate with respect to spar 1511. Through the combination of (a) rotating the leading edge structure 1525 and (b) displacing the location of rigid arms 1530-1533 with respect to spars 1510 and 1511, the chord "C" is angularly off-set from the direction of arrows "f" and the shape of fluid foil 1540 is altered. In contrast, without the carrier devices 1505 and 1506, the rotation of the leading edge structure 1525 primarily contributes to angularly off-setting the chord "C" from the direction of arrows "f" and the shape of fluid foil 1540 would be different because the location of rigid arms 1530-1533 with respect to spars 1510 and 1511 would not change. Rotation in the direction opposite "r" creates a similar, but reverse, change to the fluid foil features.

As with previous embodiments, the camber of fluid foil 1540 may or may not be altered when the leading edge structure 1525 is rotated, for example, by designing rigid arms 1530-1533 to retain the same, or substantially the same, camber before and after rotating leading edge structure 1525. One or more optional link structures 1555 may be attached between carrier device 1506 and skin 1546 to help keep the skin 1546 together at the trailing edge 1550.

The attachment, size, location, spacing device components, or other suitable aspects of a spacing device may be altered depending on the environment a fluid foil operates in and the speeds at which a fluid foil operates. For example, fluid foil 800 may be suited to relatively high speed applications such as the wing of an aircraft or on a hydrofoil boat. Fluid foil 800*a* may be suited to relatively low speed applications such as a sailboat keel or wind turbine blade. While preferred embodiments are illustrated, they are not meant to be limiting, as other suitable arrangements for a spacing device may be used.

FIG. 10 illustrates a fluid foil 900 including an exemplary link 1005 for retaining the first and second longitudinal trailing edges 965 proximate one another and further permitting the first and second longitudinal trailing edges 965 to slide with respect to one another when the leading edge structure 905 is rotated. The link 1005 preferably includes a substantially flat bar 1010 which is located between the spar 935 and the trailing edge 966. The substantially flat bar 1010 has a leading edge 1015 facing the spar 935 and a back edge 1020 facing the trailing edge 966.

A first skin retaining arm 1025 extends from the bar 1010 with a first end rotatably attached proximate the back edge of the bar 1020 and with a second end rotatably attached to the interior side 951 of the skin 950 proximate the first longitudinal edge 965. A second skin retaining arm 1030 extends from the bar 1010 in a direction substantially opposite the first skin retaining arm 1025. The second skin retaining arm 1030 includes a first end rotatably attached proximate the back edge of the bar 1020 and with a second end rotatably attached to the inner side 951 of the skin 950 proximate the second longitudinal edge 965.

A third skin retaining arm 1035 extends from the bar 1010 with a first end rotatably attached proximate the leading edge of the bar 1015 and with a second end rotatably attached to the inner side 951 of the skin 950. A fourth skin retaining arm 1040 extends from the bar 1010 with a first end rotatably attached proximate the leading edge of the bar 1015 and with a second end rotatably attached to the inner side 951 of the skin 950. The fourth skin retaining arm 1040 extends from the bar 1010 in a direction substantially opposite from the direction the third skin retaining arm 1035 extends from the bar 1010. The rotatable connections for the skin retaining arms 1025, 1030, 1035, and 1040 may include hinges, ball and socket connections, living hinges, or other suitable connector.

Figure 11:
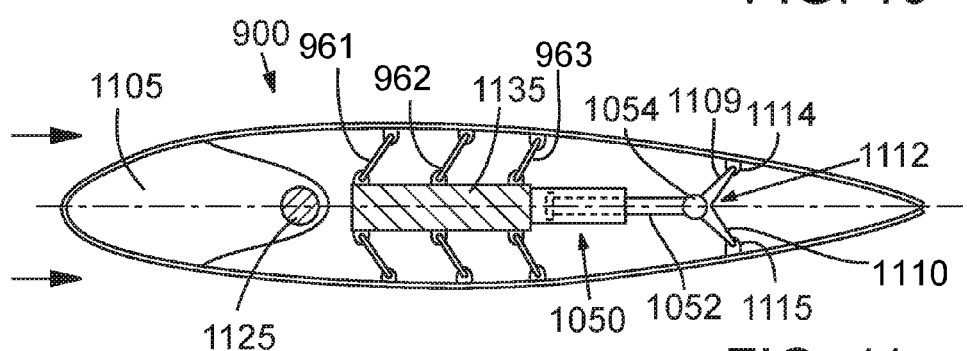
FIG. 11 illustrates another exemplary link for maintaining the first and second trailing edges of the skin proximate one another.

Other suitable constructions for a link may be used in alternate embodiments. For example, as illustrated in FIG. 11, another exemplary link 1112 may include an angled bracket made from an "L" shaped length of metal. The angled bracket is located between the spar 1135 and the trailing edge 1166 and has a first section 1109 and a second section 1110. Preferably, sections 1109 and 1110 are the same length. The first section 1109 is rotatably secured to the inner side 1151 of the skin 1150 via a rotating attachment 1114, such as a hinge, ball and socket connection, or other suitable attachment. A second section 1110 extends from the first section 1109, and is likewise secured to the inner side 1151 of the skin 1150 by a rotating attachment 1115. An actuator 1050 may be included to push or pull on the link 1112 as described below. In FIG. 11, the actuator 1050 is pivotally connected to the link 1112 by a pivoting joint 1054.

Figure 12:
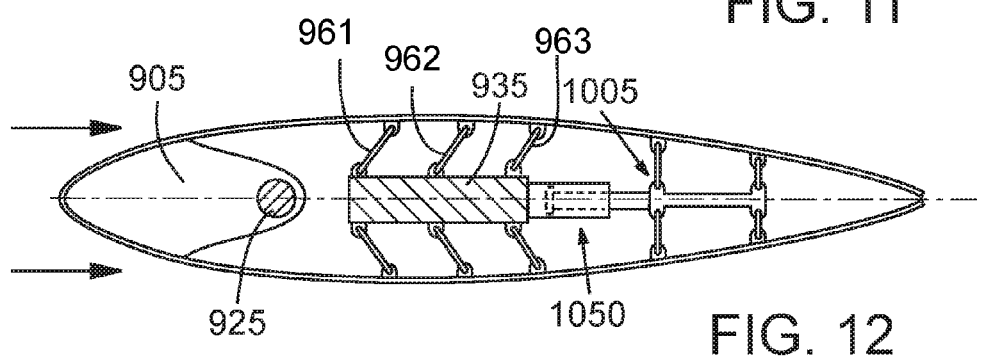
FIGS. 12 through 12C illustrate sectional views of fluid foils including schematic diagrams for an actuator for pushing on a link and bringing the edges of the skin closer to the centerline of a fluid foil.
Figure 12A:
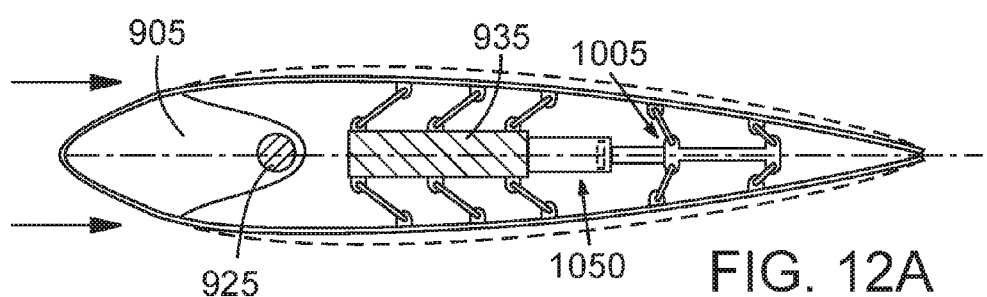

As illustrated in FIGS. 12 and 12A, one or more actuators 1050 may be included to push, or pull, at least a portion of a link, for example the link 1005, in a direction away from, or toward, the spar 935. Preferably, pushing on the link 1005 causes the bar 1010 to move away from the spar 935, thereby pushing on the skin 950 and causing the trailing edges 965 to move away from the spar 935. When the skin portion 950 is tensioned, is causes the rigid arms 961-963 and the link arms 1025, 1030, 1035, and 1040 to pull the skin 950 closer to the spar 935. Moving the skin 950 closer to the spar 935 causes the profile of the fluid foil 900 to decrease, that is, the distance from one side of the skin 950 to the opposite side of the skin 950 is reduced. Decreasing the profile of the fluid foil 900 reduces the amount of drag caused by moving the fluid foil through a fluid. The actuator, or actuators, 1050 used to push on the link 1005 may include mechanical jacks, cam mechanisms, hydraulic and pneumatic actuators, electric motors, or other suitable actuators.

Alternatively, the leading edge structure of a fluid foil may be made from, or include, a deformable material and may deform when stress is applied to the skin. Such a deformable material may include natural rubber, synthetic rubbers or foams, metals, or other suitable material. For example, the actuator 1050 may push a link away from the spar, thereby tensioning the skin and further reducing the profile of the fluid foil when a layer of natural rubber between the leading edge structure and the skin deforms. Alternatively, the entire leading edge structure may deform, or a portion of the leading edge structure may deform. Preferably, the deformable material substantially returns to its original shape when the stress on the skin is removed.

Figure 12B:
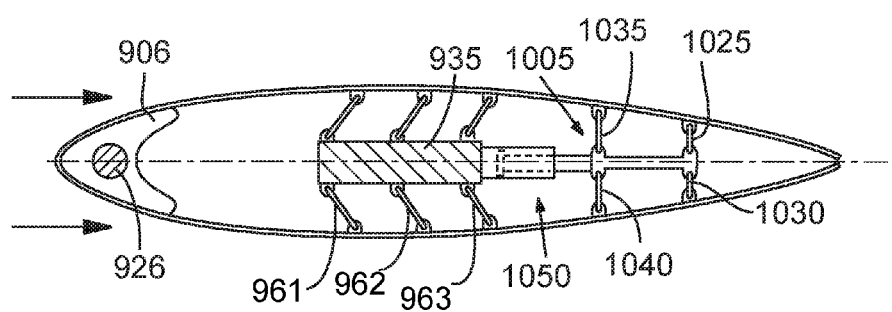
Figure 12C:
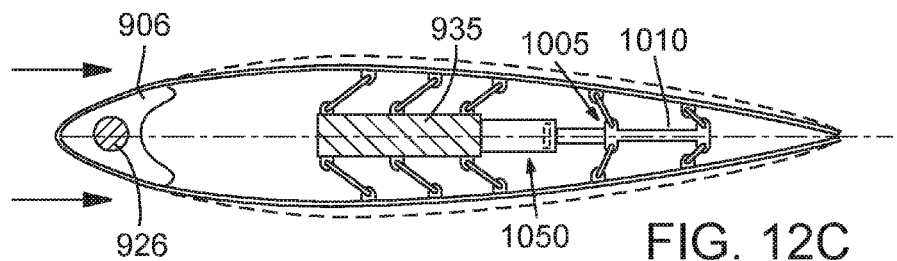

Another exemplary deformable leading edge 906 is illustrated in FIGS. 12B and 12C. When one or more actuators 1050 push at least a portion of link 1005 in a direction away from the spar 935, the bar 1010 moves away from the spar 935. Moving the bar 1010 away from spar 935 tensions the skin 950 and causes the trailing edges 965 to move away from the spar 935. The rigid arms 961-963 and the link arms 1025, 1030, 1035, and 1040 pull the skin 950 closer to the spar 935. The two arm portions of leading edge structure 906 deform towards each other, thereby permitting the skin 950 to move closer to the spar 935 which causes the profile of the fluid foil 900 to decrease, that is, the distance from one side of the skin 950*a* to the opposite side of the skin 950*b* is reduced. When the tension is removed from the skin 950, the two arm portions of the leading edge structure 906 preferably return, or substantially return, to their original position illustrated in FIG. 12B.

As illustrated in FIGS. 13A-13E, a shape shifting foil 1300 may surround an object such as the ballast 1372 of a sailboat keel, an aircraft fuselage (not illustrated), or other suitable object. For example, ballast 1372 may have an aperture (not illustrated) sized to rotatably receive axle 820. Bearing sleeves (not illustrated) or other suitable fittings may rotatably secure axle 820 in ballast 1372.

Skin connectors 1305 may attach axle 820 to the skin 1350*a* and 1350*b* such that rotation of axle 820 causes movement of the skin 1350*a* and 1350*b*. For example, rigid links 1306 may be rotatably attached to the skin connectors 1305 and rotatably attached to the skin 1350*a* and 1350*b*, such as by swivel mounts 1387. A spacing device, for example, a plurality of rigid arms 1386 rotatably attached to ballast 1372 and the skin 1350*a* and 1350*b*, may hold the skin 1350*a* and 1350*b* at a desired distance from ballast 1372, and may cause the skin 1350a and 1350b to move closer to and farther from ballast 1372 as the axle 820 rotates.

In the embodiment illustrated in FIGS. 13A-13E, skin portion 1350a may be attached to skin portion 1350b at the nose section 1310. For example, skin portions 1350a and 1350b may be opposing halves of a teardrop shaped foil 1300 that envelopes ballast 1372. A seam 1355 (FIG. 13E) is created where the skin portions 1350a and 1350b meet. Starting at the nose portion 1310, the skin portions 1350a and 1350b may be secured together along seam 1355 for a distance "d" extending back from the nose portion 1310. Securing the skin portions 1350a and 1350b together along the distance "d" preferably substantially prevents the skin portions 1350a and 1350b from sliding with respect to each other over the distance "d." Preferably, securing the skin portions 1350a and 1350b along the distance "d" occurs on both opposing sides of the ballast 1372.

After the distance "d," and extending to the trailing edge 1365, the skin portions 1350a and 1350b preferably slide with respect to each other when the axle 820 is rotated. The skin portions 1350a and 1350b may be held in a slidable relationship with each other along the seam 1355 by slidable structures, such as those described above with respect to FIGS. 4-5E, or by other suitable structure. Alternately, fluid pressure may be sufficient to hold the skin portions 1350a and 1350b together along the seam 1355, and a separate structure may not be needed.

The skin portions 1350a and 1350b may have a seam that is located at any angular position with respect to the object the skin portions 1350a and 1350b surround. Alternately, the skin portions 1350a and 1350b need not be symmetric, or the skin 1350 may include one substantially complete piece.

Figure 13A:
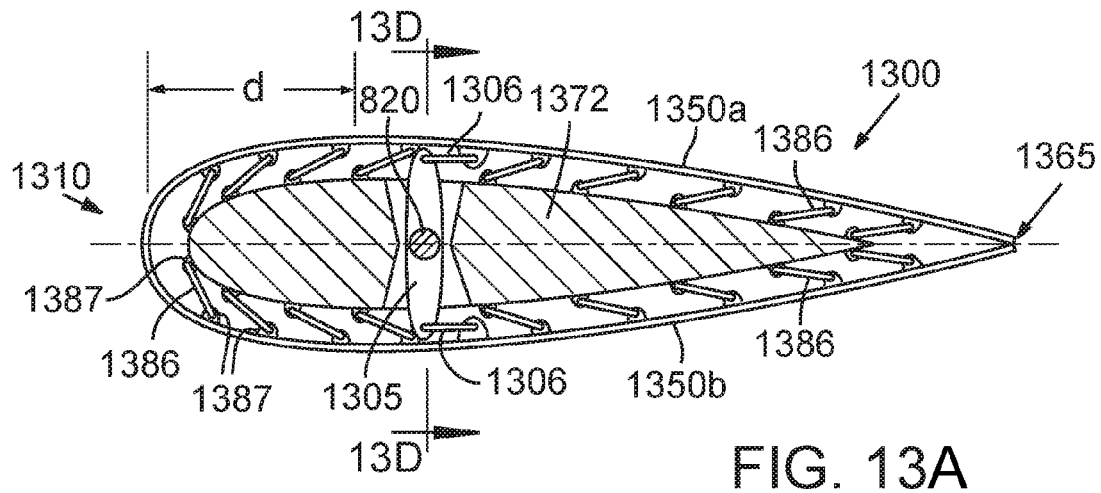
FIG. 13A illustrates a ballast including a fluid foil and a spacing device attached to the ballast.
Figure 13B:
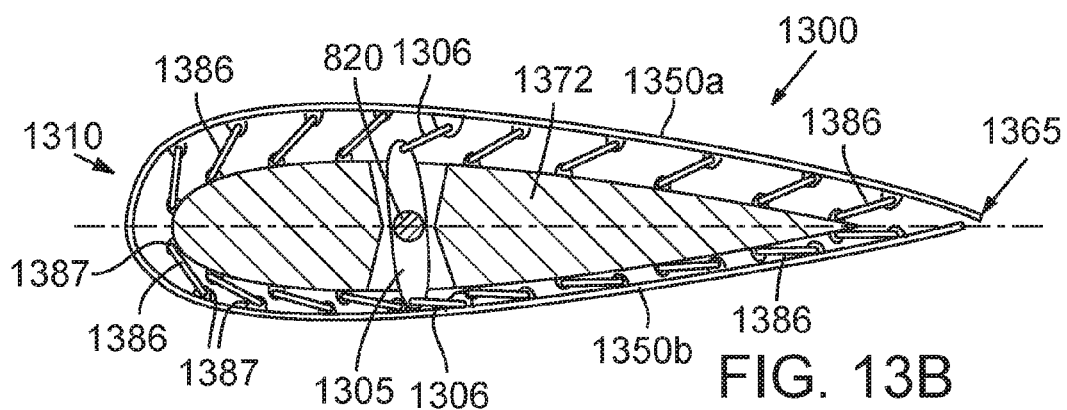
FIG. 13B illustrates the fluid foil and the spacing device attached to the ballast of FIG. 13A shifted in a first direction.
Figure 13C:
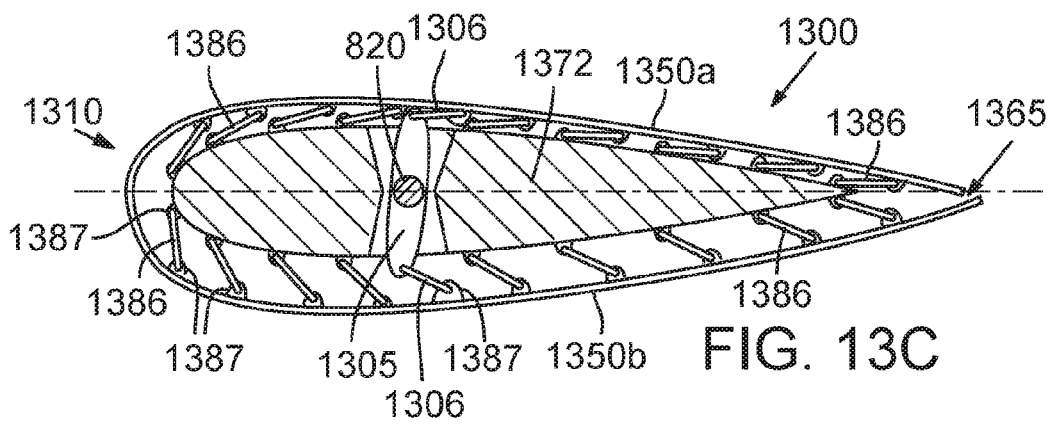
FIG. 13C illustrates the fluid foil and the spacing device attached to the ballast of FIG. 13A shifted in a second direction.
Figure 13D:
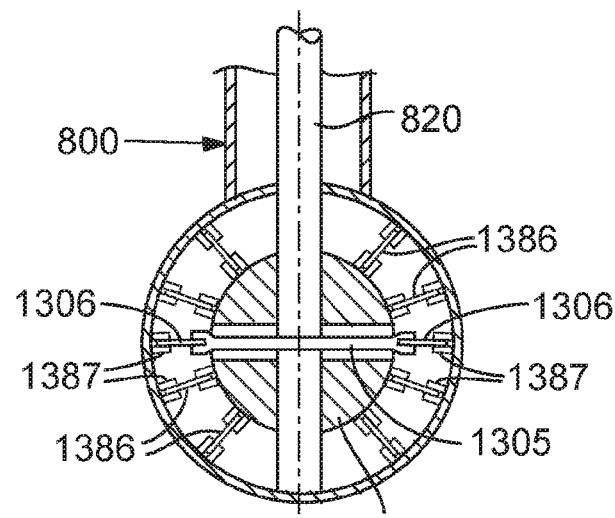
FIG. 13D illustrates a front cross-sectional view of the ballast taken along line 13D-13D of FIG. 13A.
Figure 13E:
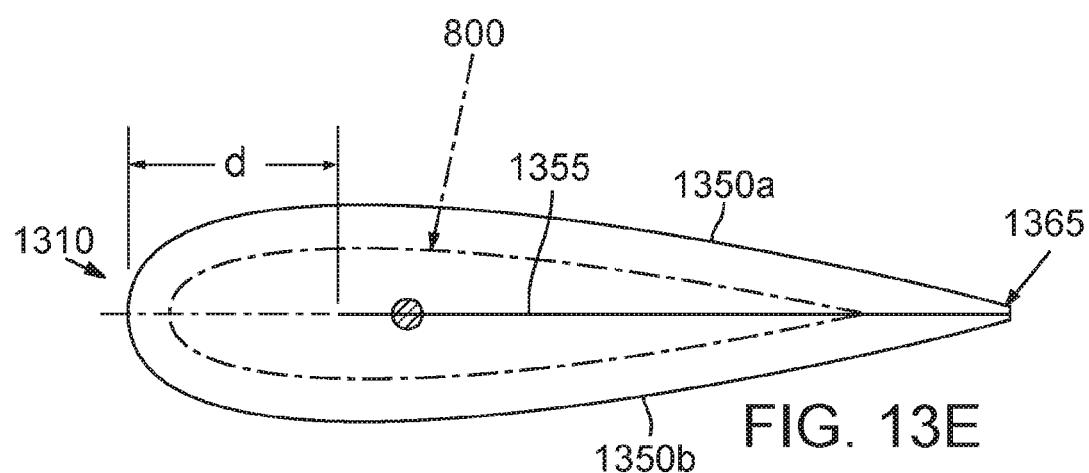
FIG. 13E illustrates a top view of the fluid foil surrounding the ballast of FIG. 13A.

As best illustrated in FIG. 13D, one axle 820 may be used to rotate both a first fluid foil, for example fluid foil 800, and a second fluid foil, for example, fluid foil 1300. The root section of axle 800 is rotatably supported by a body, such as a boat hull, (not illustrated) and rotates a fluid foil, such as fluid foil 800, as described above. Instead of the tip end of the axle 820 terminating at the tip end of the fluid foil, such as fluid foil 800, the tip end of axle 820 extends past the fluid foil and through an object, such as ballast 1372. The object, such as ballast 1372, preferably includes a spacing device, for example, spacing devices as described above, or other suitable spacing devices, and a fluid foil 1300 supported by the spacing device. Skin connectors 1305 are preferably non-rotatably attached to axle 820 and rotatably attached to the skin portions 1350a and 1350b of the fluid foil 1300. In addition to shifting the shape of the first fluid foil, such as fluid foil 800 for example, rotating axle 820 thus also causes the second fluid foil, such as fluid foil 1300, to shift its shape, preferably in a manner comparable to the shape-shifting of the first fluid foil.

Alternately, separate axles may be used to rotate separate fluid foils, and the fluid foils may be shape shifted in complimentary or opposing manners.

One method for using a shape shifting foil includes a method for sailing a sailboat, comprising setting a point of sail substantially into the wind and arranging at least one sail to trim the sailboat to maintain the point of sail as commonly known. A leading edge structure of the sailboat keel is rotated to change the angle of attack of the keel with respect to water flowing over the keel. Rotating the leading edge structure of the keel also changes the symmetry of the keel to an asymmetric keel. Changing the angle of attack and the symmetry of the keel further trims the sailboat to bring the sailboat's actual direction of travel more in line with the sailboat's heading. When the leading edge structure is rotated, a skin on the first side of the keel is pulled in the direction of the leading edge structure rotation. At the same time, the skin on the first side of the keel moves away from a centerline of the keel.

While the skin on the first side of the keel is pulled by rotating the leading edge structure, the skin on the second opposing side of the keel is pushed in the direction of rotation of the leading edge structure. The skin on the second side of the keel is simultaneously moved towards the centerline of the keel. The trailing longitudinal edges of the skin on the first side of the keel and of the skin on the second side of the keel slide away from one another when the leading edge structure rotates.

It will be obvious to those having skill in the art that many changes may be made to the details of the above-described embodiments without departing from the underlying principles of the invention. For example, a shape shifting fluid foil may be incorporated as a portion of a fluid foil, thereby creating a fluid foil with static portions and with dynamic, shape shifting portions. As another example, a shape shifting fluid foil may be used as a "hard" sail on a sailboat, thus replacing a traditional fabric sail or current "hard" sail. The scope of the present invention should, therefore, be determined only by the following claims.

The invention claimed is:

1. A fluid foil comprising:
   a spar having a root section secured to a body and a tip end located distal from the body;
   an axle having a root section secured to the body and a tip end located distal from the body;
   a leading edge structure defining a leading edge contour, the leading edge structure having a root section proximate the body and tip end distal from the body, and the leading edge structure attached to the axle for rotating the leading edge structure therewith with respect to the spar; and
   a skin having a root edge proximate the body, a tip edge distal from the body, a first longitudinal trailing edge extending between the root edge and the tip edge, a second longitudinal trailing edge extending between the root edge and the tip edge, opposite interior and exterior faces, the skin wrapped around the leading edge structure and over the spar with the exterior face facing away from the leading edge structure and the interior face facing the leading edge structure, a portion of the skin connected to the leading edge structure, and the first and second longitudinal trailing edges slidably engaging one another to form a trailing edge of the fluid foil, wherein rotation of the axle rotates the leading edge structure therewith and the leading edge structure transmits force from the axle to slidably rotate the skin around the spar, thereby shaping a contour of the fluid foil.

2. A fluid foil according to claim 1, further comprising an actuator for applying rotational force to the axle.

3. A fluid foil according to claim 2, wherein the actuator is configured to apply rotational force to the axle to form at least one differential fluid feature along a length of the fluid foil.

4. A fluid foil according to claim 1, further comprising:
   a tip cover attached to the fluid foil for substantially inhibiting fluid from flowing from the exterior face of the skin over the tip edge of the skin to the interior face of the skin.

5. A fluid foil according to claim 2, wherein:
the skin includes a continuous sheet without seams extending between the first and second longitudinal trailing edges;
the axle is rotatably secured to the body; and
the axle is rotably secured to the tip cover.

6. A fluid foil according to claim 1, wherein a portion of the sheet proximate the first longitudinal trailing edge and a portion of the sheet proximate the second longitudinal trailing edge are bent and coupled to form a slidable interlocking structure to hold the first and second longitudinal trailing edges proximate each other.

7. A fluid foil according to claim 4, wherein the fluid foil is a sailboat keel, and the tier cover further includes a ballast attached to the tip end of the spar.

8. A fluid foil according to claim 1, further comprising a fence attached to the first side of the skin and extending above the first side of the skin, the fence located proximate the tip edge of the skin to substantially inhibit water from flowing from the first side of the skin over the tip edge of the skin.

9. A fluid foil according to claim 1, further comprising:
a spacing device connected to the spar for holding the skin in a spatial relationship with respect to the spar.

10. A fluid foil according to claim 9, wherein the spacing device includes a plurality of arms, each arm having a first end connected to the spar and a second end connected to the interior face of the skin.

11. A fluid foil according to claim 10, wherein:
the spar includes a longitudinal length extending from the root section to the tip end;
the spacing device includes a first plurality of arms aligned substantially in a row along the longitudinal length of the spar on a first side of the spar; and
the spacing device includes a second plurality of arms aligned substantially in a row along the longitudinal length of the spar on an opposing second side of the spar.

12. A fluid foil according to claim 10, wherein the spar has a leading section, a mid section, and a trailing section, and wherein:
a first arm includes a hinge located on the spar leading section;
a second arm includes a hinge located on the spar mid section;
a third arm includes a hinge located on the spar trailing section; and
the second arm is longer than either the first or third rigid arms.

13. A fluid foil according to claim 11, wherein the spacing device includes a rigid structure the skin slides over.

14. A fluid foil according to claim 12, wherein the spacing device includes a deformable structure attached between the spar and the skin.

15. A fluid foil according to claim 13, wherein the spacing device further includes a carrier device.

16. A fluid foil according to claim 1, further comprising a link connected to the interior face of the skin between the spar and the first longitudinal trailing edge of the skin, the link also connected to the interior face of the skin between the spar and the second longitudinal trailing edge of the skin, the link retaining the first and second longitudinal trailing edges proximate each other and further permitting the first and second longitudinal ling edges to slide with respect to each other when the leading edge structure is rotated.

17. A fluid foil according to claim 16, further comprising an actuator, the actuator connected between the spar and the link for moving at least a portion of the link away from the spar to thereby move the trailing edge away from the spar and thereby move the skin closer to a first side of the spar and closer to an opposing second side of the spar.

18. A fluid foil according to claim 1, wherein at least a portion of the skin proximate the second longitudinal trailing edge includes a magnetic material, and further comprising:
a magnet attached to the second side of the skin proximate the first longitudinal trailing edge, the magnet located to engage the magnetic material and to permit the first longitudinal trailing edge to slide with respect to the second longitudinal trailing edge.

19. A fluid foil according to claim 1, further comprising:
a fairing attached to the body and overlying the first side of the skin proximate the body to substantially inhibit fluid from flowing between the body and the root edge of the skin; and
a tip cover boot connected to the tip cover and overlying the first side of the skin proximate the tip edge to substantially inhibit fluid from flowing from the first side of the skin and over the tip edge of the skin into interior of the fluid foil.

20. A fluid foil according to claim 1, wherein the first and second longitudinal trailing edges slide relative to one another in a chordwise direction to accommodate rotation of the skin.

* * * * *